United States Patent
Hinderthuer

(10) Patent No.: US 8,300,659 B2
(45) Date of Patent: Oct. 30, 2012

(54) METHOD AND A SYSTEM FOR TRANSPORTING OF DATA WITH INTEGRATED PROTOCOL MAPPING FUNCTION

(75) Inventor: Henning Hinderthuer, Finning (DE)

(73) Assignee: ADVA AG Optical Networking, Munich (DE)

( * ) Notice: Subject to any disclaimer, the term of this patent is extended or adjusted under 35 U.S.C. 154(b) by 19 days.

(21) Appl. No.: 12/334,045

(22) Filed: Dec. 12, 2008

(65) Prior Publication Data

US 2009/0154493 A1    Jun. 18, 2009

(30) Foreign Application Priority Data

Dec. 12, 2007  (EP) .................................. 07 123 047
May 20, 2008  (EP) .................................. 08 156 577

(51) Int. Cl.
*H04J 3/16* (2006.01)
(52) U.S. Cl. ...................................................... 370/466
(58) Field of Classification Search ........................ None
See application file for complete search history.

(56) References Cited

U.S. PATENT DOCUMENTS

| 7,518,883 | B1 * | 4/2009 | Suitor et al. | 361/788 |
|---|---|---|---|---|
| 2003/0218981 | A1 | 11/2003 | Scholten | |
| 2005/0265329 | A1 | 12/2005 | Havala et al. | |
| 2006/0159112 | A1 * | 7/2006 | Sundaram et al. | 370/412 |
| 2007/0086479 | A1 * | 4/2007 | Ling et al. | 370/463 |
| 2008/0089693 | A1 * | 4/2008 | El-Ahmadi et al. | 398/135 |

FOREIGN PATENT DOCUMENTS

WO  03/084281  10/2003

OTHER PUBLICATIONS

Steve Gorshe, Generic Framing Procedure (GFP), Technology White Paper, Apr. 2005.*
Okamoto S. et al., "IP Backbone Network Utilizing Photonic Transport Network Technologies", Optical Networks Magazine, SPIE, Bellingham, WA, US, vol. 1, No. 1, (Jan. 1, 2001), pp. 19-28.
Office Action dated Mar. 27, 2009 in corresponding European Patent Application 08156577.2.
Office Action dated Mar. 30, 2009 in corresponding European Patent Application 08171513.8.
Office Action dated Mar. 30, 2009 in corresponding European Patent Application 07150171.2.
Office Action dated Mar. 30, 2009 in corresponding European Patent Application 08171352.1.
Office Action dated Apr. 4, 2009 in corresponding European Patent Application 08171052.7.
Office Action dated Apr. 6, 2009 in corresponding European Patent Application 08171206.9.
Office Action dated Apr. 6, 2009 in corresponding European Patent Application 08171376.0.

* cited by examiner

*Primary Examiner* — Jianye Wu
(74) *Attorney, Agent, or Firm* — F. Chau & Associates, LLC

(57) ABSTRACT

The invention relates to a network comprising at least one host device having an interface card connected to a backplane of said host device, wherein said interface card comprises at least one cage for receiving a pluggable module which performs a traffic management of data transported via at least one optical fiber connected to said pluggable module.

12 Claims, 32 Drawing Sheets

State of the art

State of the art

State of the art

State of the art

Fig. 8
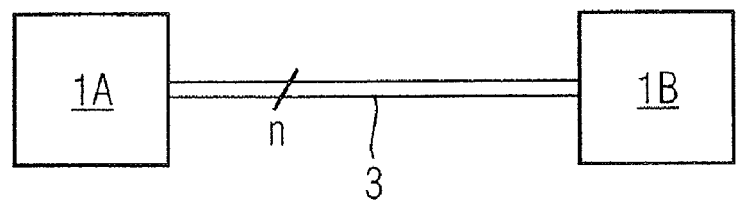
Fig. 9A                    Fig. 9B
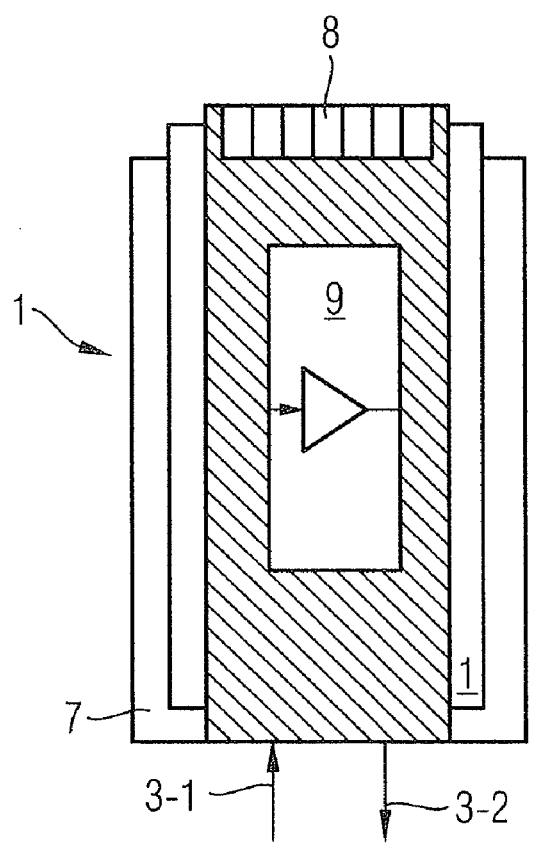 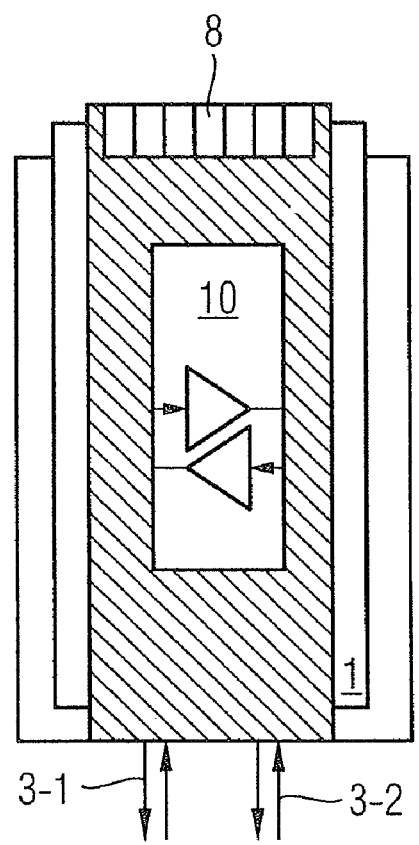

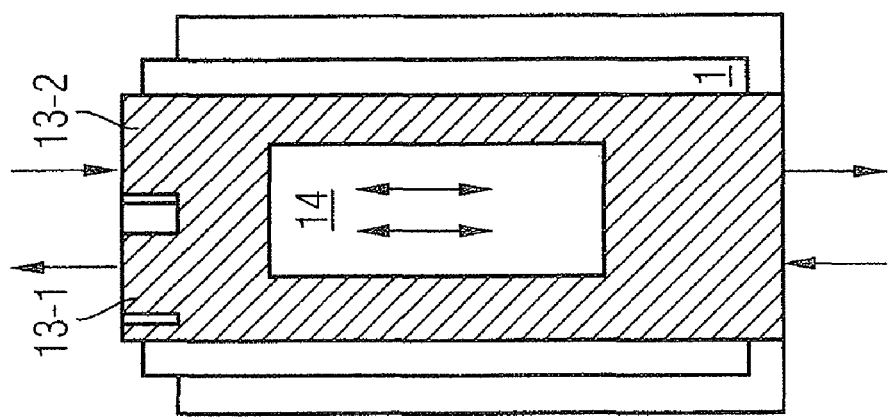
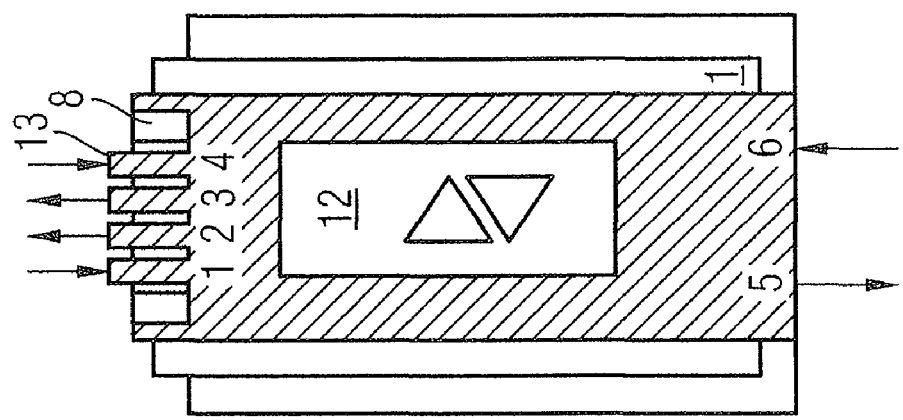
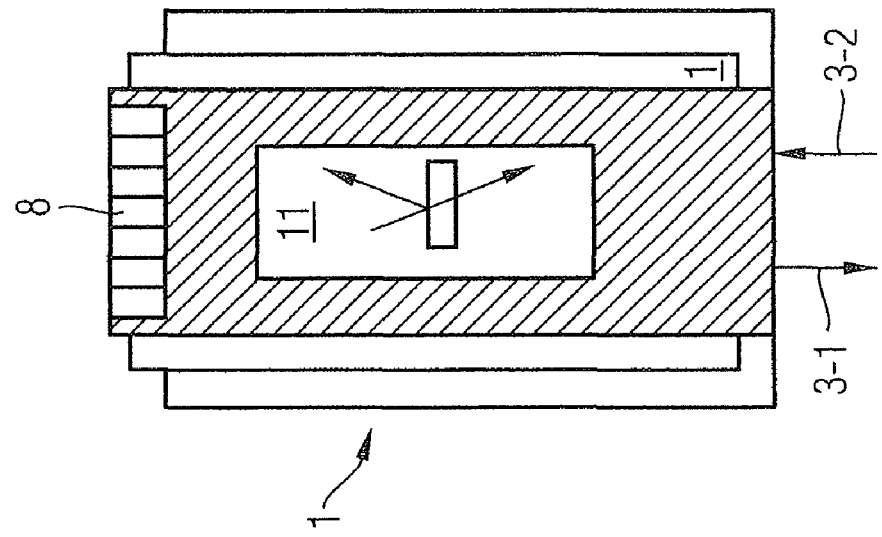

Fig. 9I
Fig. 9J
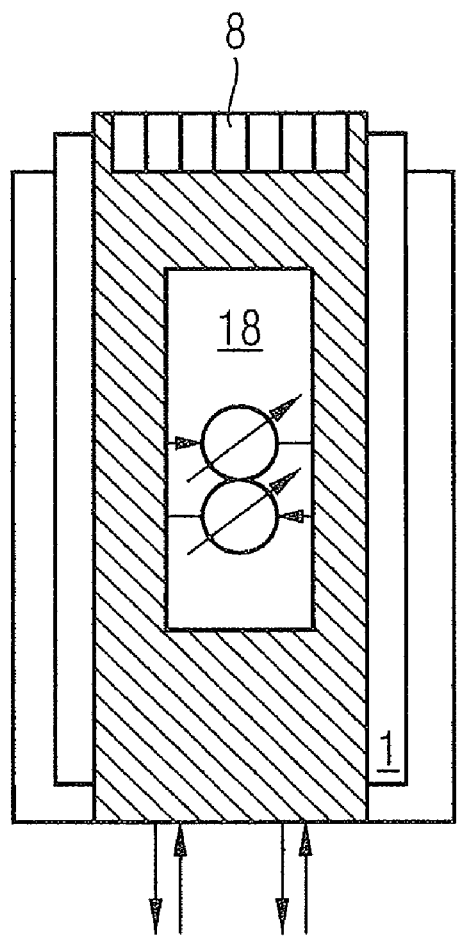
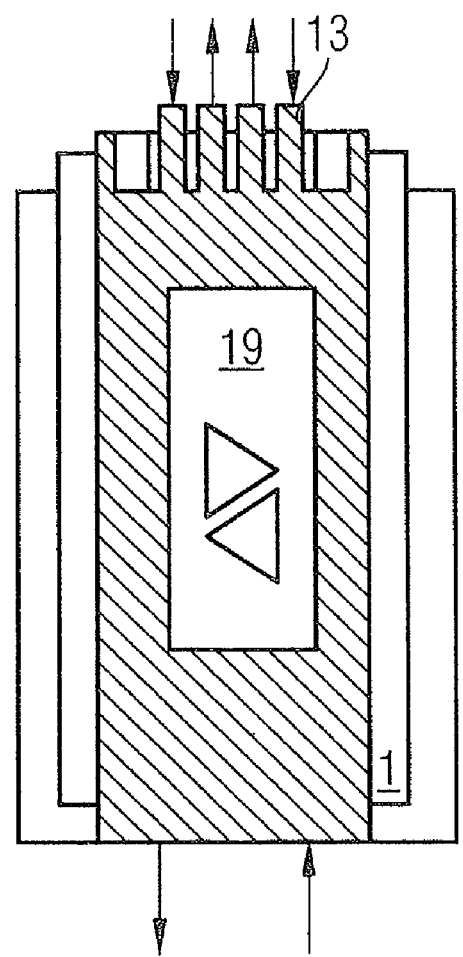

Fig. 15

| Byte | Bit | Name | Description |
|---|---|---|---|
| Converted analog values. Calibrated 16 bit data. | | | |
| 96 | All | Temperature MSB | Internally measured module temperature. |
| 97 | All | Temperature LSB | |
| 98 | All | Voc MSB | Internally measured supply voltage in transceiver. |
| 99 | All | Voc LSB | |
| 100 | All | TX Bias MSB | Internally measured TX Bias Current. |
| 101 | All | TX Bias LSB | |
| 102 | All | TX Power MSB | Measured TX output power. |
| 103 | All | TX Power LSB | |
| 104 | All | RX Power MSB | Measured RX input power. |
| 105 | All | RX Power LSB | |
| 106-109 | All | Unallocated | Reserved for future diagnostic definitions |
| Optional Status/Control Bits | | | |
| 110 | 7 | TX Disable State | Digital state of the TX Disable input Pin. Updated within 100 msec of change on pin. |
| | 6 | Soft TX Disable | Read/Write bit that allows software disable of laser. Writing '1' disables laser. See Table 3.11 for enable/ disable timing requirements. This bit is "OR'd with the hard TX_DISABLE pin value. Note per SFP MSA TX_DISABLE pin is default enabled unless pulled low by hardware. If Soft TX Disable is not implemented the transceiver ignores the value of this bit. Default power up value is zero/low. |
| | 5 | RS(1) State | Reserved for digital state of input pin AS(1) per SFF-8079 and RS(1) per SFF-8431. Updated within 100msec of change on pin. |
| | 4 | Rate Select State | Digital state of the SFP Rate Select Input Pin. Updated within 100msec of change on pin. Note: This pin is also known as AS(0) in SFF-8079 and RS(0) in SFF-8431. |
| | 3 | Soft Rate Select | Read/write bit that allows software rate select control. Writing '1' selects full bandwidth operation. This bit is "OR'd with the hard Rate_Select AS(0) or RS(0) pin value. See Table 3.11 for timing requirements. Default at power up is logic zero/ low. If Soft Rate Select is not implemented, the transceiver ignores the value of this bit. Note: Specific transceiver behaviors of this bit are identified in Table 3.6a and referenced documents. See Table 3.18a, byte 118, bit 3 for Soft RS(1) Select. |
| | 2 | TX Fault | Digital state of the TX Fault Output Pin. Updated within 100 msec of change on pin. |
| | 1 | LOS | Digital state of the LOS Output Pin. Updated within 100 msec of change on pin. |
| | 0 | Data_Ready_Bar | Indicates transceiver has archieved power up and data is ready. Bit remains high until data is ready to be read at which time the device sets the bit low. |
| 111 | 7-0 | Reserved | Reserved for SFF-8079. |

Fig. 17A

| Byte | Bit | Name | Description |
|---|---|---|---|
| Converted analog values. Calibrated 16 bit data. | | | |
| 96 | All | Temperature MSB | Internally measured module temperature. |
| 97 | All | Temperature LSB | |
| 98 | All | Voc MSB | Internally measured supply voltage in transceiver. |
| 99 | All | Voc LSB | |
| 100 | All | TX Bias MSB | Internally measured TX Bias Current. |
| 101 | All | TX Bias LSB | |
| 102 | All | TX Power MSB | Measured TX output power. |
| 103 | All | TX Power LSB | |
| 104 | All | RX Power MSB | Measured RX input power. |
| 105 | All | RX Power LSB | |
| 106-109 | All | Unallocated | Reserved for future diagnostic definitions |
| Optional Status/Control Bits | | | |
| 110 | 7 | TX Disable State | Digital state of the TX Disable input Pin. Updated within 100 msec of change on pin. |
| | 6 | Soft TX Disable | Read/Write bit that allows software disable of laser. Writing '1' disables laser. See Table 3.11 for enable/ disable timing requirements. This bit is "OR'd with the hard TX_DISABLE pin value. Note per SFP MSA TX_DISABLE pin is default enabled unless pulled low by hardware. If Soft TX Disable is not implemented the transceiver ignores the value of this bit. Default power up value is zero/low. |
| | 5 | RS(1) State | Reserved for digital state of input pin AS(1) per SFF-8079 and RS(1) per SFF-8431. Updated within 100msec of change on pin. |
| | 4 | Rate Select State | Digital state of the SFP Rate Select Input Pin. Updated within 100msec of change on pin. Note: This pin is also known as AS(0) in SFF-8079 and RS(0) in SFF-8431. |
| | 3 | Soft Rate Select | Read/write bit that allows software rate select control. Writing '1' selects full bandwidth operation. This bit is "OR'd with the hard Rate_Select AS(0) or RS(0) pin value. See Table 3.11 for timing requirements. Default at power up is logic zero/ low. If Soft Rate Select is not implemented, the transceiver ignores the value of this bit. Note: Specific transceiver behaviors of this bit are identified in Table 3.6a and referenced documents. See Table 3.18a, byte 118, bit 3 for Soft RS(1) Select. |
| | 2 | TX Fault | Digital state of the TX Fault Output Pin. Updated within 100 msec of change on pin. |
| | 1 | LOS | Digital state of the LOS Output Pin. Updated within 100 msec of change on pin. |
| | 0 | Data_Ready_Bar | Indicates transceiver has archieved power up and data is ready. Bit remains high until data is ready to be read at which time the device sets the bit low. |
| 111 | 7-0 | Reserved | Reserved for SFF-8079. |

METHOD AND A SYSTEM FOR TRANSPORTING OF DATA WITH INTEGRATED PROTOCOL MAPPING FUNCTION

TECHNICAL BACKGROUND

The invention relates to a method and a system for transport of data and in particular to a pluggable module for bidirectional transporting of data via at least one optical fibre between host devices.

FIG. 1 shows an architecture of an optical network according to the state of the art. The network architecture is hierarchical having the highest data rates in an optical core network, such as a back-bone network of a country. To each core network several optical metro networks can be connected, for instance in a ring structure. To each metro network in turn several access networks can be connected. The edge of the network as shown in FIG. 1 is formed by terminal devices T which can be connected via xDSL (version of Digital Subscriber Line) to a host device, for example to a switch in an DSLAM (Digital Subscriber Line Access Multiplexer). This switch is connected via an optical transport system (designated as FSP in all figures) and optical transport means to a transport system of a local exchange. The core, metro and access network can have a ring structure, for example formed by two optical fibres and by transport systems. The optical fibres can transport data by means of wave length division multiplexing WDM. In wave length division multiplexing WDM optical carrier signals are multiplexed on a single optical fibre by using different wave lengths λ (colours) to carry different data signals. This allows an increased bandwidth and makes it possible to perform bidirectional communication over one strand of fibre. WDM-systems allow to expand the capacity of a network without laying more fibre. The capacity of an optical fibre can be expanded by upgrading multiplexers and demultiplexers at each end. This is often done by using optical-to-electrical-to-optical conversion at the edge of the transport network to permit interoperation with existing equipment. WDM-systems can be divided in different wave length patterns, i.e. conventional or coarse and dense WDM (CWDM, DWDM). A recent development relating course WDM is the creation of GBIC (Gigabit Interface Converter) and Small Form Factor Pluggable (SFP) transceivers using standardized CWDM-wave lengths.

As can be seen from FIG. 1, an optical network can be formed by two main components, i.e. by a transport system and by host devices. Host devices include switching devices, such as routers, bridges, Ethernet switches, fibre channel switches or cross-connects. The network architecture as shown in FIG. 1 comprises optical interconnections, optical transport systems and host devices, such as switches or routers. The separation of functionality in two different device types of the conventional network as shown in FIG. 1, i.e. on the one hand transport of data (by the transport system) and on the other hand aggregation/switching data (by the host devices) increases complexity and costs.

Accordingly, it has been proposed to shift functionality of the transport system, in particular the electrical-to-optical conversion, into the host device by using pluggable transceivers.

A small form factor pluggable (SFP) is a compact optical transceiver using optical communication. A conventional small form factor pluggable module interfaces a network device mother board of a host device, such as a switch or router to an optical fibre or unshielded twisted pair networking cable. The SFP-transceivers are available in a variety of different transmitter and receiver types allowing users to select an appropriate transceiver for each link to provide a required optical reach over the available optical fibre type.

A SFP-transceiver is specified by a multi-source agreement (MSA) between competing manufacturers. The SFP-module is designed after the GBIC-interface and allows greater data port density (i.e. number of transceivers per inch along the edge of a mother board) than GBIC. SFP-transceivers are commercially available and have a capability for data rates up to 4.25 Gbit/sec. A variant standard, XFP, is capable of 10 Gbit/sec.

Some SFP-transceivers support digital optical monitoring functions according to the industry standards SSF 8472 (ftp://ftp.seagate.com/sff/SFF-8472.PDF) multi-source agreement (MSA). This makes it possible for an end user to monitor real time parameters of the SFP-module, such as optical output power, optical input power, temperature, laser bias current and transceiver supply voltage.

FIGS. 2, 3 show a pluggable standard SFP-transceiver module according to the state of the art. The SFP pluggable module comprises an electrical interface connecting the pluggable module with a mother board of a host device by plugging the module into a cage of the host device board. On the front side of the pluggable module at least one optical fibre is attached to the module.

FIG. 4 shows a conventional system with pluggable SFP-transceivers according to the state of the art. A host device, such as a switch or router, comprises a controller which is connected via a backplane to interface cards each having several cages which allow to plug in SFP-modules as shown in FIG. 3. A transceiver within the pluggable module performs a conversion of the applied electrical signals to an optical signal which is forwarded via an optical fibre to the transport system. The transport system comprises several cards which comprise several cages for plug-in SFP-transceiver modules. These interface cards allow a switching, i.e. multiplexing or demultiplexing of signals within the electrical domain in response to control signals generated by a controller of the transport system and received via an internal management connection. From the interface cards within the transport system the switched or controlled signals are applied to further modules for optical signals or optical fibres. These modules can, for example comprise variable optical attenuators (VOA), multiplexers/demultiplexers, amplifiers, switchers etc. From the transport system connected to the near end host device, the signals are forwarded via optical fibres to remote far end transport systems over a distance of many kilometers, wherein the remote transport systems are in turn connected to far end host devices.

The conventional system as shown in FIG. 4 has as an disadvantage that the complexity of the system is quite high because three domain conversions on the near end side and on the far end side have to be performed. As can be seen from FIG. 4, an electrical signal of the near end host device is converted within the pluggable SFP-transceivers plugged into the interface card of the host device to an optical signal and then retransformed from the optical domain to the electrical domain by a SFP-transceiver plugged into a cage of an interface card of the transport system. After an electrical switching is performed depending on the control signal supplied by the controller of the transport system, the electrical signal is again transformed from the electrical domain into an optical domain by another plugged in SFP-transceiver. Accordingly at the near end side, three domain conversions, i.e. an electrical-to-optical, an optical-to-electrical and an electrical-to-optical conversion are necessary. On the far end side, the three conversions are performed again resulting in a total of six domain conversions. Because of the necessary domain conversions, the technical complexity of the system is quite high. Since two different devices, i.e. a host device and a transport system have to be provided on each side management efforts, the occupied space and power consumption are increased.

In conventional systems, specific blades within Ethernet or SDH-apparatuses are necessary to support protocol mapping. These blades occupy considerable space within an apparatus. The management connection between apparatuses comprising different protocols are performed normally via external DCNs. This also increases the complexity of the system.

Accordingly, it is an object of the present invention to provide a method and a system which reduce the complexity of a network.

SUMMARY OF THE INVENTION

The invention provides a network comprising at least one host device having an interface card connected to a backplane of said host device,
wherein said interface card comprises at least one cage for receiving a pluggable module which performs a protocol mapping between an application protocol and a transport protocol.

In a possible embodiment of the network according to the present invention, said protocol mapping is performed GFP (Generic Framing Procedure) based.

In an embodiment of the network according to the present invention, the protocol mapping from the application protocol to the transport protocol is performed by the following steps:
- separating management data and user data of said application protocol,
- performing the GFP (Generic Framing Procedure) based mapping of said user data into containers of said transport protocol,
- performing a concatenation of said containers to transport protocol frames each consisting of a header and payload, and
- performing a direct mapping of said management data of said application protocol into the headers of said transport protocol frames.

In a possible embodiment of the network according to the present invention, said protocol mapping from the transport protocol to the application protocol is performed according to the following steps:
- performing a direct mapping of transport protocol management data provided within headers of transport protocol frames to management data of said application protocol,
- fragmentation of transport protocol frames into containers of said transport protocol,
- performing the GFP (Generic Framing Procedure) based mapping of the containers into user data of said application protocol, and
- combining said directly mapped management data with said GFP mapped user data.

In a possible embodiment of the network according to the present invention, the application protocol is formed by an Ethernet protocol or by a fibre channel protocol.

In a possible embodiment of the network according to the present invention, the transport protocol is formed by a SDH or a SONET protocol.

In a possible embodiment of the network according to the present invention, the concatenation comprises a virtual concatenation (VCAT) or a contiguous concatenation (CCAT).

In a possible embodiment of the network according to the present invention, during said protocol mapping, protocol monitoring parameters are automatically extracted and supplied to the host device.

In a possible embodiment of the network according to the present invention, the protocol monitoring parameters indicate variants of the employed application and transport protocols.

In an embodiment of the network according to the present invention, the pluggable module is a MSA compatible pluggable module which comprises an integrated protocol mapping unit with a power consumption of less than 500 mW.

In an embodiment of the network according to the present invention, said indicated protocol mapping unit is formed by a FPGA or an ASIC.

In a possible embodiment of the network according to the present invention, the pluggable module provides at least one embedded communication channel which exchanges performance monitoring data and configuration data between said pluggable module and a far-end device.

The invention further provides an interface card for a host device comprising at least one cage for receiving a pluggable module which performs a protocol mapping between a transport protocol and an application protocol.

The invention further provides a host device comprising at least one interface card connected to a backplane of the host device,
wherein the interface card comprises at least one cage for receiving a pluggable module which performs a protocol mapping between a transport protocol and an application protocol.

The invention further provides a data transport system for transporting optical data via at least one optical fibre,
wherein at one or both ends of said optical fibre a pluggable module is attached which performs a protocol mapping between a transport protocol and an application protocol.

The invention further provides a method for transporting data between host devices of a network via at least one optical fibre,
wherein the pluggable module attached to said optical fibre is connected to said corresponding cage of one of said host devices and performs an energy efficient protocol mapping between an application protocol and a transport protocol.

BRIEF DESCRIPTION OF THE DRAWINGS

In the following, embodiments of the method and system according to the present invention are described with reference to the enclosed figures.

FIG. 8 shows an embodiment of a transport data system according to an embodiment of the present invention;

FIGS. 9A-9J show different embodiments of a pluggable module according to the present invention;

FIG. 15 shows a section within the memory shown in FIG. 14;

DETAILED DESCRIPTION OF EMBODIMENTS

Figure 5:
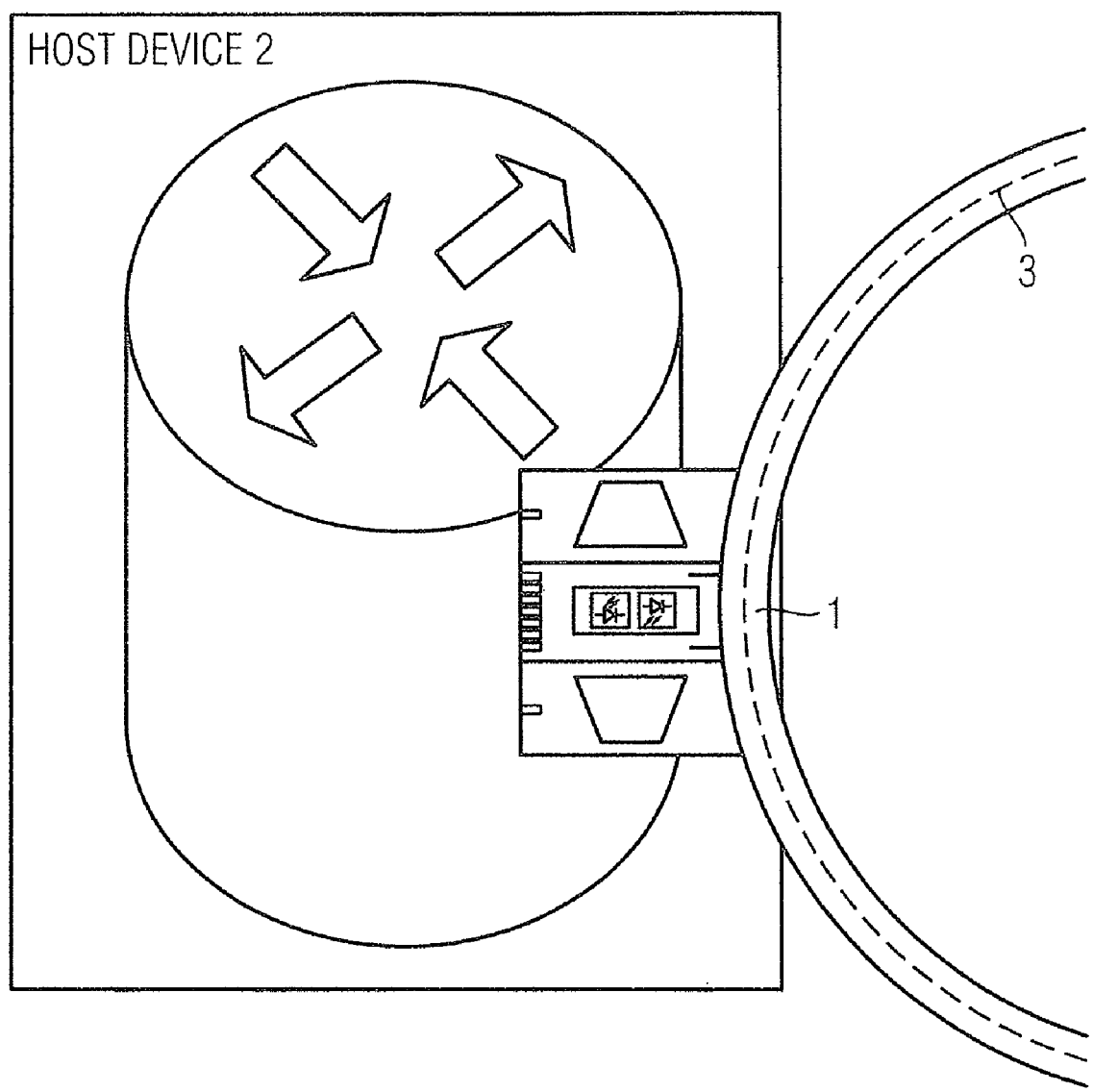
FIG. 5 shows a block diagram of a host device with a plugged in pluggable module according to the present invention.

FIG. 5 shows a pluggable module 1 according to the present invention plugged into a cage 6 of a host device 2. The host device 2 can be a switching device, such as a router, a bridge, an Ethernet bridge or a fibre channel switch. The pluggable module 1 as shown in FIG. 5 is adapted to be plugged into a corresponding cage 6 of the host device 2 and performs in a possible embodiment a traffic management of data which is transported bidirectionally via at least one optical fibre 3 between host devices 2 of a data network. Traffic management can comprise the provision of an Embedded Communication Channel (ECC), reporting of DMI data via said Embedded Communication Channel, digital performance monitoring, Latency measurements, performing of link tests, protocol mapping time-slot based ADM, asymmetric TDM as well as optical signal processing. The pluggable module 1 according to the present invention performs a protocol mapping between an application protocol and a transport protocol as explained in more detail with reference to FIGS. 26 to 28.

The traffic management of the data is performed within the pluggable module 1 and can be either performed in the electrical domain or in the optical domain. The pluggable module 1 as shown in FIG. 5 comprises an SFP (small form factor) pluggable module and also supports digital monitoring functions according to SFF 8472. The pluggable module 1 according to the present invention does not only perform transceiver functions, i.e. conversion between the optical and electrical domain, but also data traffic management functions. The data traffic management is performed by the pluggable module 1 as a near end and far end traffic management of the transported data. The data traffic management is formed by a pluggable module 1 on the basis of the communication between the pluggable module 1 and different host devices 2 of the optical network. In a possible embodiment, the communication is using a SFF 8742-programming page structure with no adaptions. In further embodiments, the traffic management can be based on a communication between the pluggable module 1 and host devices 2, wherein the communication is using a SFF 8742-programming page structure with no adaptions and a time division multiplex update procedure to buffer additional near end or far end parameters within the provided SFF 8742-programming page structure. In an alternative embodiment, the traffic management can be based on a communication between the pluggable module 1 and host devices 2, wherein the communication is using a SFF 8742-programming page structure with additional address spaces. The traffic management can be based on a communication between the pluggable module 1 as shown in FIG. 5 and a far end pluggable module which is attached to a remote end of the optical fibre 3 as shown in FIG. 5. The pluggable module 1 as shown in FIG. 5 comprises several transport management functionalities, such as protection switching, performance monitoring, OAM, DCN (Data Communication Network), mapping and framing, amplification, reconfigurable optical add/drop multiplexing (ROADM) and dispersion compensation DC. Further traffic management functionalities can comprise an optical transmission impairment mitigation, such as amplification and chromatic polarization mode compensation. A traffic management functionality provided by a pluggable module 1 according to the present invention is electrical transmission and impairment mitigation with forward error correction and electronic dispersion compensation. A further traffic management functionality of the pluggable module 1 according to the present invention can be in one embodiment OAM (operation administration and maintenance) functionalities, such as performance monitoring, default management, inter-device communication, configuration management and security management.

In a possible embodiment, the pluggable module 1 according to the present invention comprises besides a protocol mapping functionality optical and/or electrical add/drop multiplexing functionalities. Furthermore, in a possible embodiment, the traffic management functionality of the pluggable module 1 comprises optical conversion with mapping and framing functions. The pluggable module 1 complies in a possible embodiment with existing MSA-agreements, such as SFP, SFP+, XFP, GBIC etc.

Figure 6:
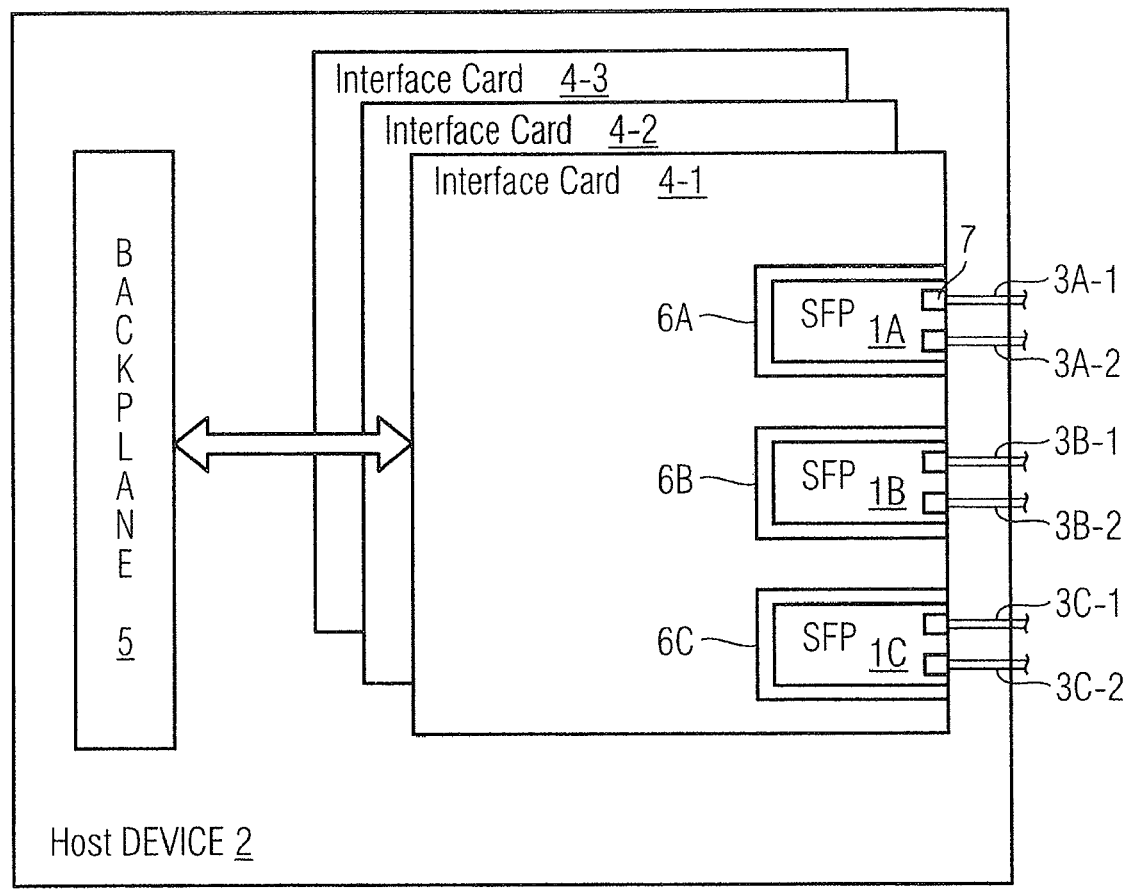
FIG. 6 shows a block diagram of a host device according to an embodiment of the present invention.

FIG. 6 shows a possible embodiment of a host device 2 according to the present invention. The host device 2 comprises at least one interface card 4 connected to a common backplane 5 of the host device 2. Each interface card 4 comprises several cages 6 for receiving pluggable modules 1 according to the present invention. In the given example of FIG. 6, the interface card 4-1 comprises three cages 6A, 6B, 6C for receiving a corresponding SFP pluggable modules 1A, 1B, 1C. Each pluggable module 1 comprises on the front side an optical interface to at least one optical fibre 3. In the given example, each SFP plug-in module 1 as shown in FIG. 6 comprises an interface with two optical fibres for bidirectional optical transport of data. On the rear side, each pluggable module 1 comprises at least an electrical interface for connecting the pluggable module 1 with the circuitry on the interface card 4 of the host device 2.

Figure 7:
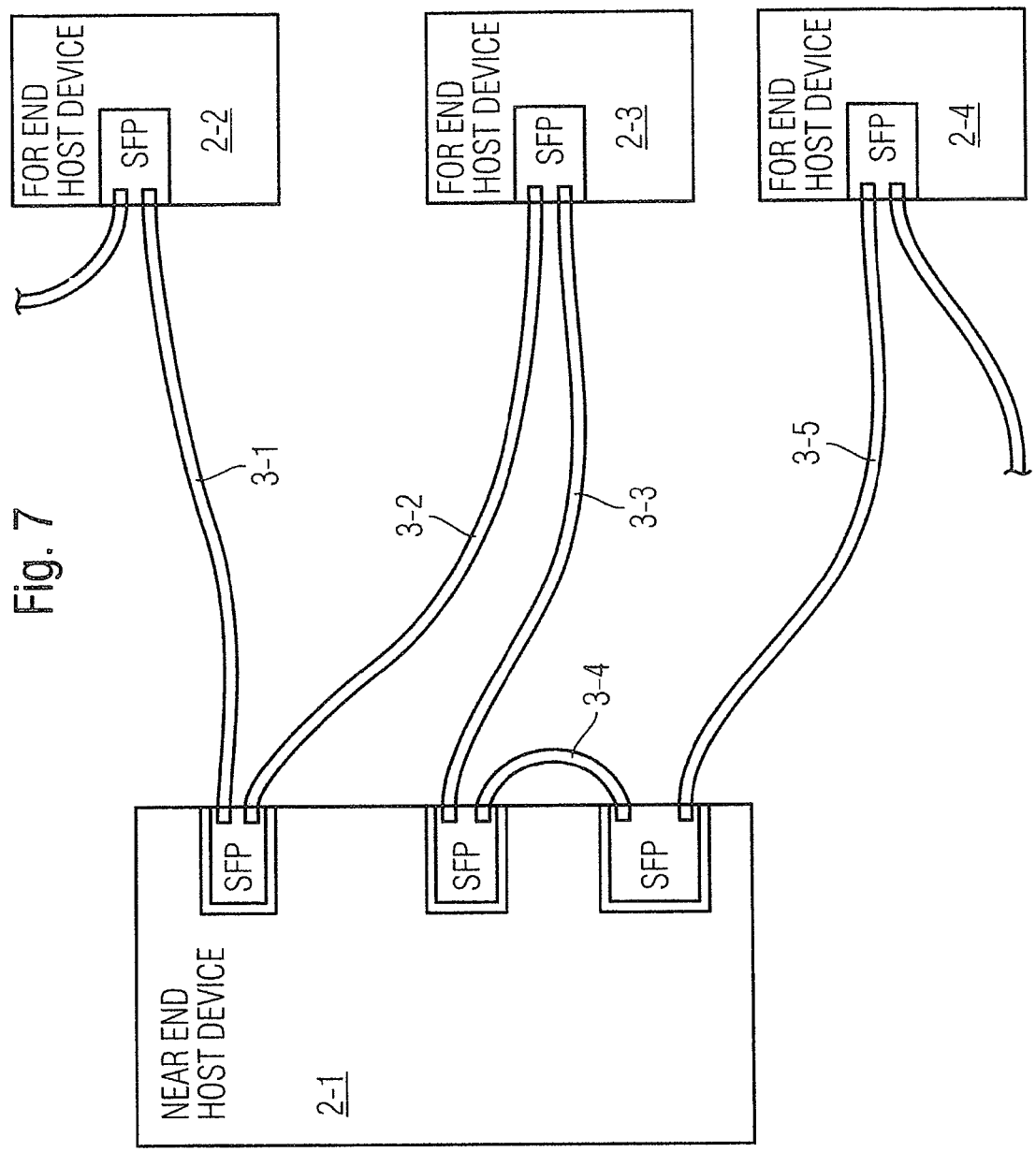
FIG. 7 shows an exemplary arrangement of host devices connected to each other by means of a data transport system according to a possible embodiment of the present invention.

FIG. 7 shows an example for connecting host devices 2 of a network via pluggable modules 1 according to the present invention. In the given example, a near end host device 2-1 can be connected via data transport systems to far end host devices 2-2, 2-3, 2-4. Each data transport system is provided for transporting bidirectional optical data via at least one optical fibre 3. At both ends of the optical fibre 3, a pluggable SFP-module 1 is attached and performs a traffic management of the transported data.

FIG. 8 shows a possible embodiment of a data transport system for transporting bidirectional optical data according to the present invention. As shown in FIG. 8, two pluggable modules 1A, 1B are attached via an optical interface to at least one optical fibre 3 connecting both modules. In a possible embodiment, at least one of the pluggable modules 1A, 1B is capable of performing a protocol mapping and a data traffic management. In a possible embodiment, both pluggable modules are formed by SFP-modules connected to each other via optical fibres 3.

As can be seen from FIG. 7, with the data transport system according to the present invention as shown in FIG. 8, it is possible to connect a near end host device 2-1 to a far end host device. It is also possible to wire the near end host device 2-1, for example via an optical fibre 3-4 as shown in FIG. 7. As can be seen from FIG. 7, the network according to the present invention has the advantage when compared to the conventional system of FIG. 4 that a separate transport system device in a separate box is no longer necessary so that wiring host devices 2 within the network is much easier and more flexible. Since the separate transport system device is no longer necessary, the optical network using the pluggable modules 1 according to the present invention needs less space and is more transparent to users performing the wiring between the host devices 2.

Figure 1:
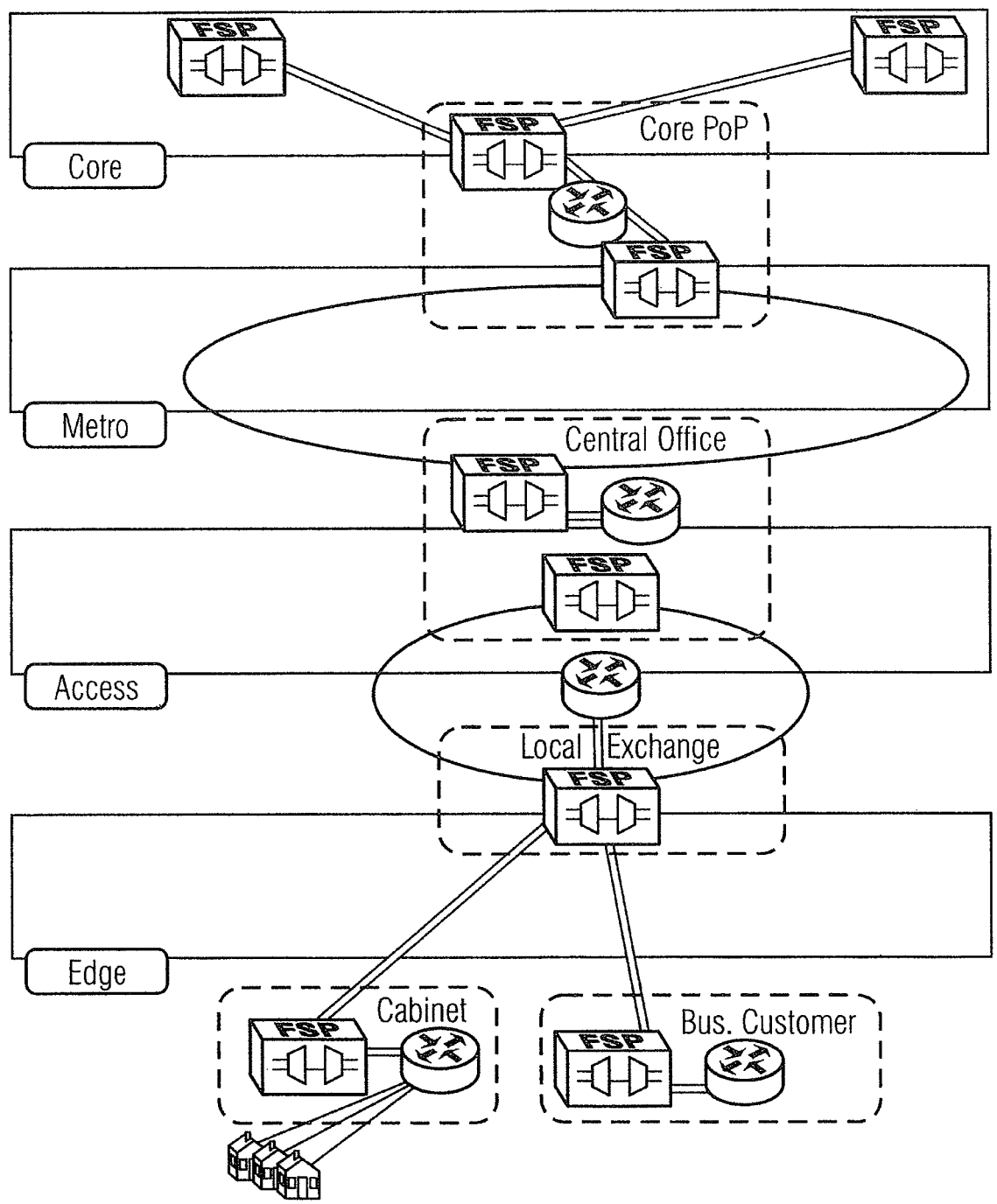
FIG. 1 shows an architecture of a hierarchical network according to the state of the art.
Figure 2:
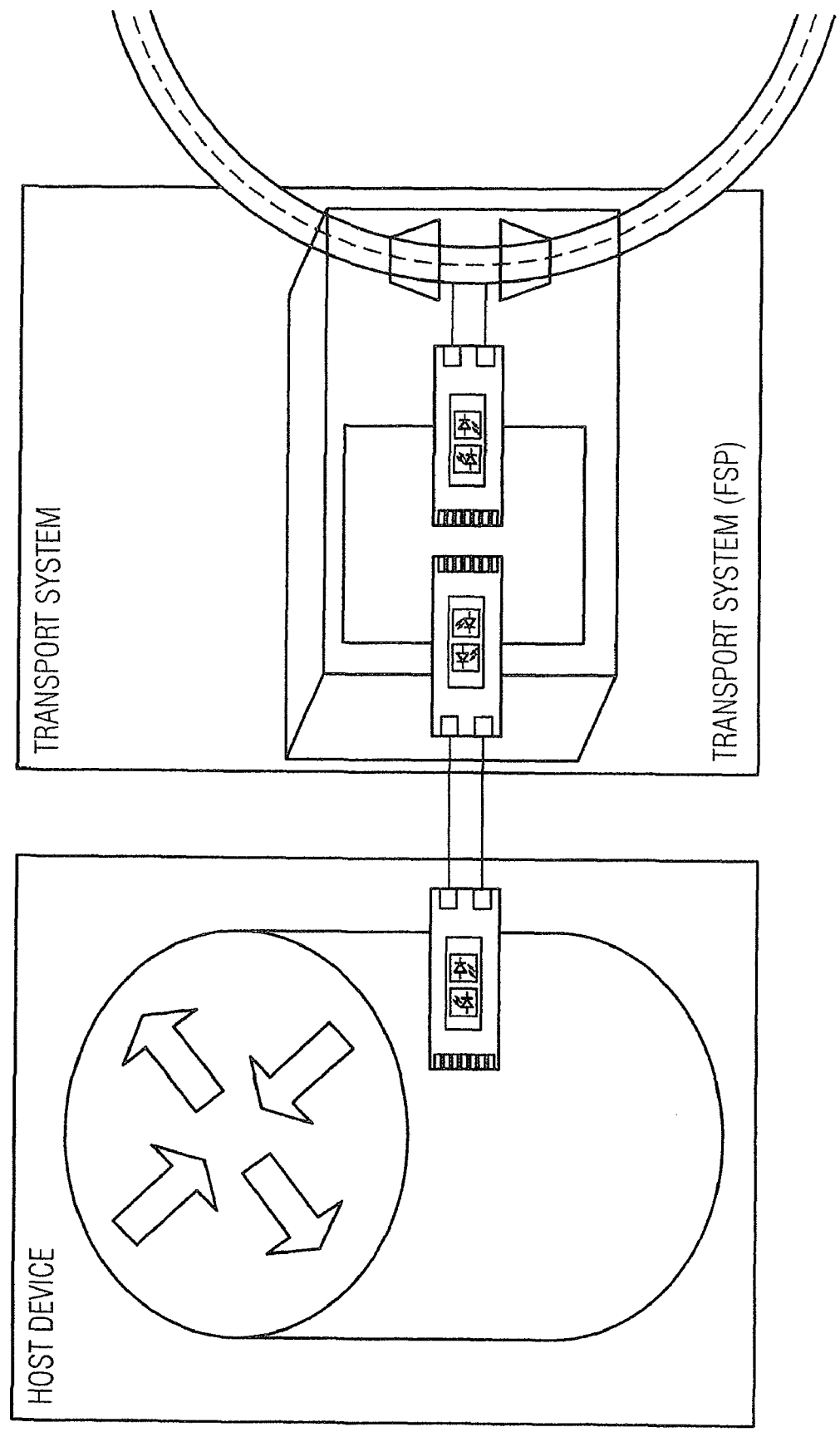
FIG. 2 shows an arrangement of a host device and a transport system according to the state of the art.
Figure 3:
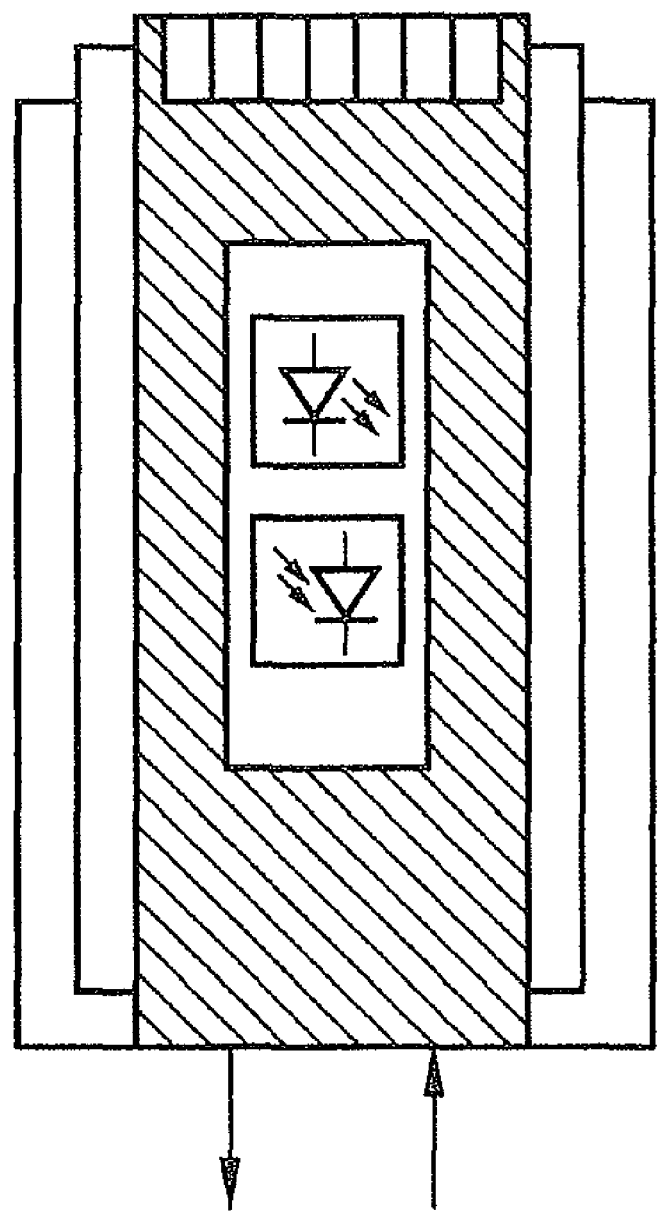
FIG. 3 shows a conventional FSP-module with a transceiver according to the state of the art.
Figure 4:
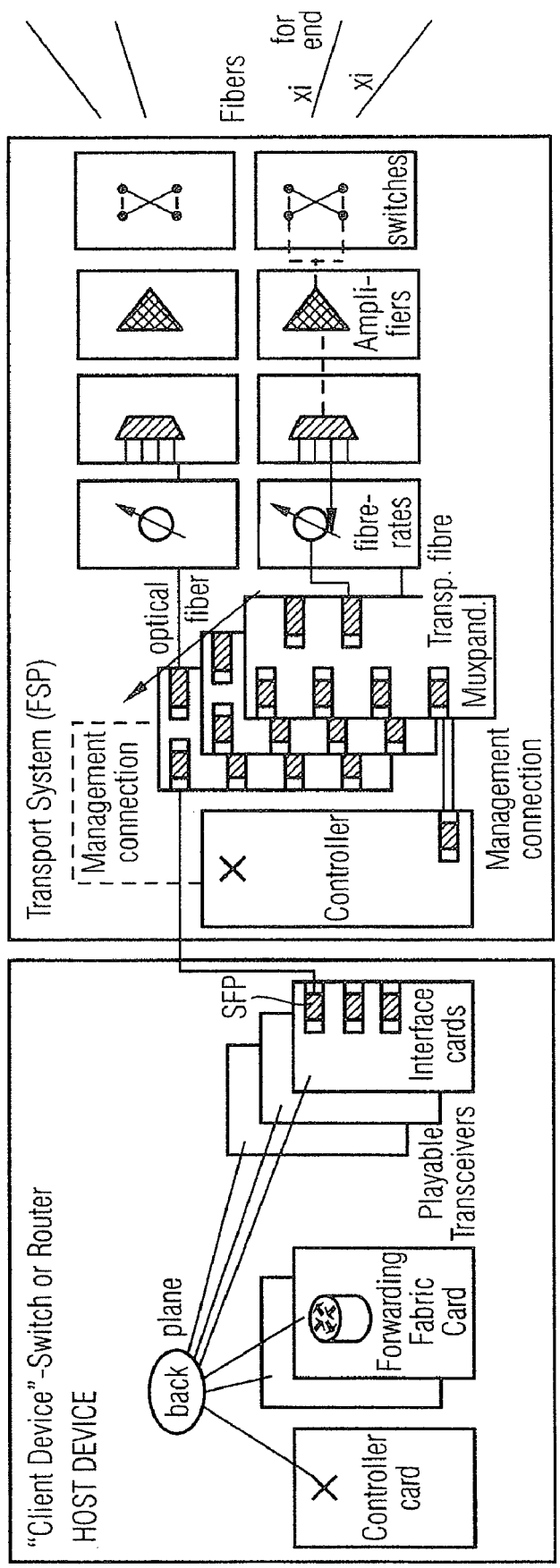
FIG. 4 shows an arrangement of a host device and a transport system according to the state of the art for illustrating the problem underlying the present invention.

A further major advantage of the optical network using the pluggable modules 1 according to the present invention resides in that the number of domain conversions between the electrical and optical domain is minimized. For the transport of data from one host device 2 to another host device 2 only one conversion on the near end side and one conversion on the far end side has to be performed. In contrast, the conventional network as shown in FIG. 4 needs three domain conversions on each side.

FIGS. 9A-9J show different embodiments of a pluggable module 1 according to the present invention. The pluggable module 1 comprises at least one optical interface 7 on the front side and an electrical interface 8 on the rear side. The electrical interface 8 comprises several electrical contacts for connecting the pluggable module 1 with the circuitry of a motherboard by inserting the pluggable module 1 into a corresponding cage 6 mounted on the mother board.

In the embodiment as shown in FIG. 9A, the pluggable module 1 comprises an unidirectional single amplifier 9 within the pluggable module 1.

The electrical interface 8 on the rear side of the pluggable module 1 can be formed by an I$^2$C bus. On the front side of the pluggable module 1, there are attached two optical fibres 3-1, 3-2, one for receiving an optical signal and one for transmitting an optical signal.

In the embodiment as shown in FIG. 9B the pluggable module 1 comprises a bidirectional signal amplifier 10, wherein each optical fibre 3-1, 3-2 transports data in both directions.

In the embodiment as shown in FIG. 9C the pluggable module 1 comprises a blocking filter 11 which can be either unidirectional or bidirectional. The blocking filter 11 can, for example block signals with different wavelength λ with the exception of a predetermined wave length. FIG. 9C shows a unidirectional blocking filter.

FIG. 9D shows a further embodiment of the pluggable module 1 according to the present invention. In the embodiment of FIG. 9D the pluggable module 1 comprises an OADM (Optical Add Drop Multiplexer)—filter 12 which is either unidirectional or bidirectional. FIG. 9D shows an unidirectional OADM-filter 12. As can be seen from FIG. 9D the pluggable module 1 has on the rear side not only an electrical interface 8 but also additional optical backplane plugs 13. In the given example, the module 1 comprises four optical backplane plugs 13. As can be seen from FIG. 9D the pluggable module 1 comprises six optical ports, i.e. four optical ports on the back side and two optical ports on the front side.

FIG. 9E shows a further embodiment of the pluggable module 1 according to the present invention. In the embodiment as shown in FIG. 9E the pluggable module 1 comprises a connector plug 14, which can be either unidirectional or bidirectional. FIG. 9E shows an unidirectional connector plug 14. The pluggable module 1 as shown in FIG. 9E connects the signals to the backplane of the host device 2 optically. To achieve this, the pluggable module 1 comprises optical backplane plugs 13-1, 13-2 as shown in FIG. 9E.

Figure 9H:
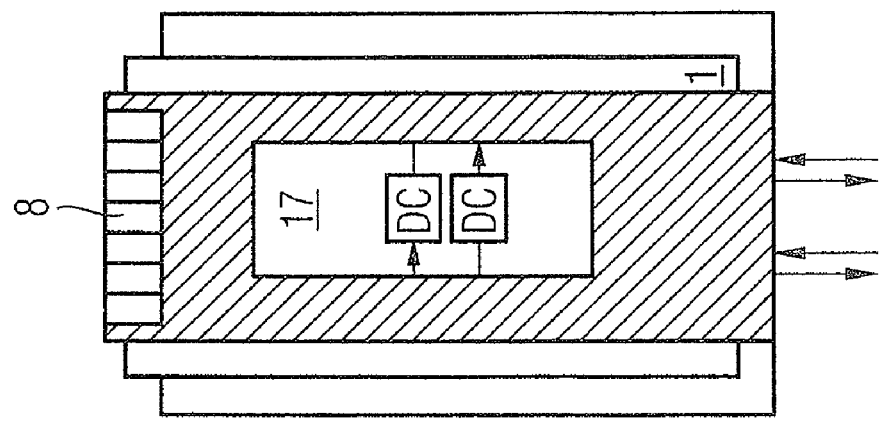
Figure 9G:
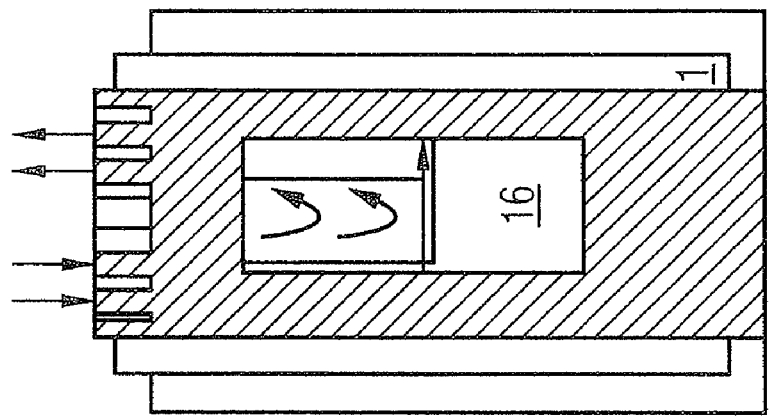
Figure 9F:
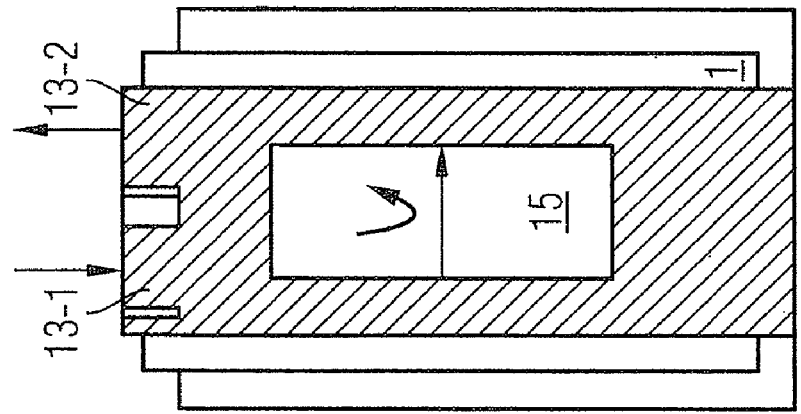

FIG. 9F shows a further embodiment of the pluggable module 1 according to the present invention. In this embodiment, the pluggable module 1 comprises a loop plug 15. The loop plug 15 can be either unidirectional or bidirectional. FIG. 9F shows a unidirectional loop plug. In the given embodiment as shown in FIG. 9F the pluggable module 1 does not comprise connectors on the front side. The loop plug 15 uses unused slots or connectors on the backside of the pluggable module 1. The loop can be either an electrical loop or an optical loop. In the example of FIG. 9F two backplane optical plugs 13-1, 13-2 form an optical loop.

FIG. 9G shows a further embodiment of the pluggable module 1 according to the present invention. In the shown embodiment the pluggable module 1 comprises a double-loop plug 16 which loops unused slots on the back side of the pluggable module 1. In the embodiment as shown in FIG. 9F no front connectors are provided. The embodiments as shown in FIG. 9F, 9A can be used for providing loops within a host device 2.

FIG. 9H shows a further embodiment of a pluggable module 1 according to the present invention. In the shown embodiment, the pluggable module 1 comprises a dispersion compensation plug 17. The dispersion compensation plug 17 can be either unidirectional or bidirectional. FIG. 9H shows a bidirectional dispersion compensation plug 17 within the pluggable module 1. The dispersion compensation unit DC can be, for example formed by a fibre bragg grating.

FIG. 9I shows a further embodiment of the pluggable module 1 according to the present invention. In the embodiment as shown in FIG. 9I the pluggable module 1 is formed by a variable optical attenuator VOA 18. The variable optical attenuator 18 can be either unidirectional or bidirectional. FIG. 9I shows a bidirectional variable optical attenuator 18.

FIG. 9J shows in a further embodiment of the pluggable module 1 according to the present invention. In the shown embodiment the pluggable module 1 comprises a power splitter 19. The power splitter 19 can be either unidirectional or bidirectional. FIG. 9J shows a unidirectional power splitter. In the given example of FIG. 9J the pluggable module 1 comprises six ports, for example port 1 may have 100%, port 5 x %, port 2 100−x % of the power and port 3, 6, 4 may have an identical signal but with other direction.

Figure 10:
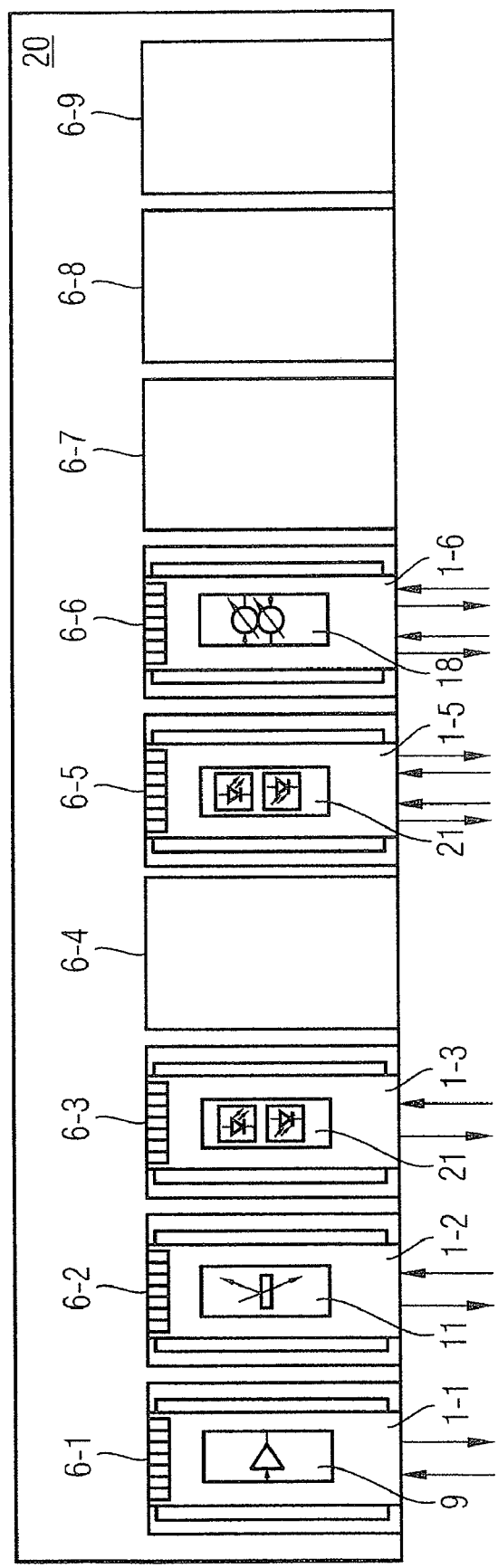
FIG. 10 shows an embodiment of an interface card as employed by a host device according to a possible embodiment of the present invention.

The host device 2 as shown in FIG. 6 may comprise in a possible embodiment an optical interface card 20 for several pluggable modules 1 according to the present invention as shown in FIG. 10. In the given example of FIG. 10, different pluggable modules 1 are plugged into a corresponding cage 6 of the interface card 20 of a host device 2. The interface card 20 comprises in the given example nine cages 6-1 to 6-9 each provided for receiving a corresponding pluggable module 1. In the given example of FIG. 10 the pluggable modules 1-1, 1-2, 1-3, 1-5 and 1-6 are plugged into the corresponding cages 6 of the interface card 20. In the given example the pluggable module 1-1 comprises an unidirectional amplifier 9, the second pluggable module 1-2 comprises a blocking filter 11 and the third pluggable module 1-3 is formed by a transceiver 21. The pluggable module 1-5 is also formed by a transceiver and the pluggable module 1-6 shown in FIG. 10 is formed by a variable optical attenuator VOA 18. The cages 6-4, 6-7, 6-8, 6-9 of the cartridge 20 are empty in the given example of FIG. 10.

Figure 11:
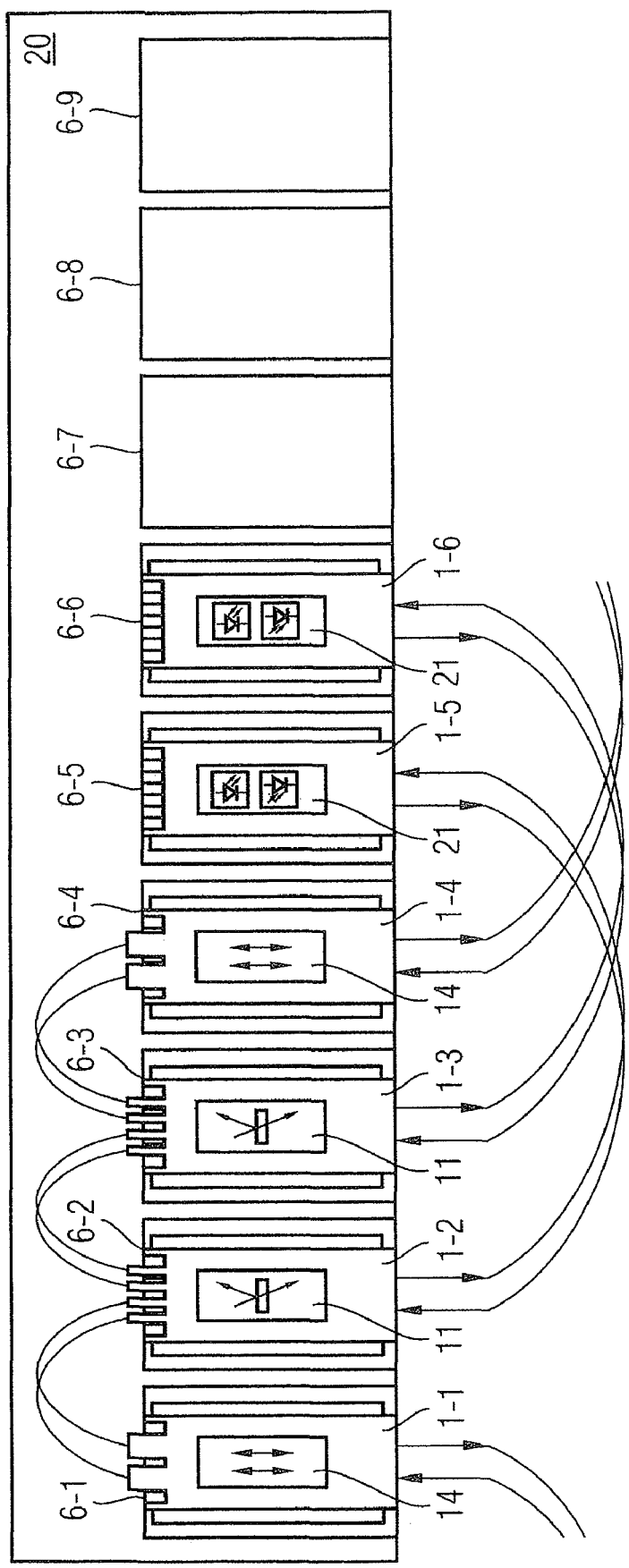
FIG. 11 shows an interface card of a host device with plugged in modules according to the present invention.

FIG. 11 shows a further example of a interface card 20 showing two wave lengths OADM. In the given example the first six cages 6-1 to 6-6 of the interface card 20 are occupied by plugged in pluggable modules 1-1 to 1-6. In the given example the first pluggable module 1-1 comprises a connector plug 14, the second pluggable module 1-2 comprises a blocking filter 11, the third pluggable module 1-3 comprises also a blocking filter 11, the fourth pluggable module 1-4 comprises a connector plug 14, the fifth pluggable module 1-5 is formed by a transceiver 21 and the sixth pluggable module 1-6 also comprises a transceiver 21.

Figure 12:
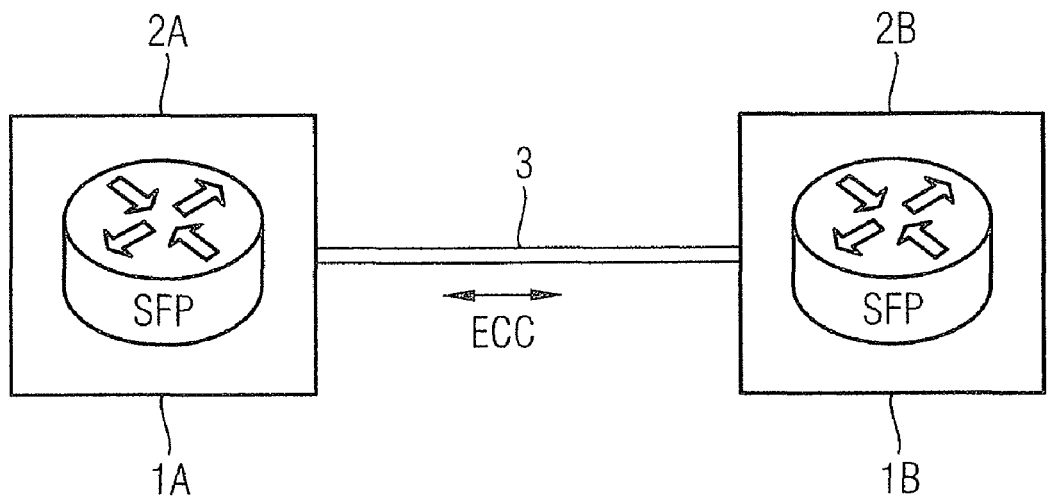
FIG. 12 shows a diagram for illustrating an embedded communication channel which is provided by a pluggable module according to an embodiment of the present invention.

In a preferred embodiment of the pluggable module 1 according to the present invention, the pluggable module 1 comprises an embedded communication channel ECC as illustrated by FIG. 12. The embedded communication channel ECC is provided between two pluggable modules 1A, 1B and is provided for exchanging management data, administrative data and performance monitoring data between the near end pluggable module 1A and a far end pluggable module 1B. In a possible embodiment the embedded communication channel ECC is implemented at a physical layer. The embedded communication channel ECC can be provided by amplitude shift keying (ASK), frequency shift keying (FSK) or phase shift keying (PSK). In a possible embodiment the embedded communication channel ECC is provided by side band modulation of a data signal of transported data. In a possible embodiment the data signal is pulse amplitude modulated.

In a further embodiment the embedded communication channel ECC between the pluggable modules 1A, 1B is implemented at a protocol layer. In a possible embodiment the embedded communication channel ECC uses a bandwidth not occupied by a transport protocol for exchanging data between the near end pluggable module 1A and a far end pluggable module 1B.

In a possible embodiment the embedded communication channel ECC is implemented on a proprietary overhead that is generated on top of a transport protocol.

In a further embodiment the embedded communication channel ECC can be implemented based on the overhead of a transport protocol, such as idle data patterns in inter-frame gaps.

In a further embodiment the embedded communication channel ECC can be implemented within a protocol layer, such as an Ethernet protocol. The embedded communication channel ECC can use existing protocol overheads or space in inter-frame gaps which can be implemented inside a protocol layer, such as EFM.

The mapping/demapping of data within the embedded communication channel ECC is performed within the pluggable module 1A, 1B.

The purpose of the provided embedded communication channel ECC is to read performance monitoring data from the far end side, write PM-data to the far end side and to perform topology detection within the network of pluggable modules 1. The embedded communication channel ECC can be provided to read communication data from the far end side and to report to an internal controller of the near end pluggable module 1. With the embedded communication channel ECC it is further possible to write configuration data to the far end pluggable module controller and to allow communication between a near end host device 2A and a far end host device 2B as shown in FIG. 11.

The provision of an embedded communication channel ECC allows remote reporting of diagnostic parameters, such as DMI. Furthermore, it is possible to make remote diagnostics parameters permanently available at a remote side, for example power local, power remote. By using standard SFF 8472 digital diagnostics I/F, it is possible to latch remote data, i.e. store the data in a memory of the pluggable module 1.

There are two main possibilities for implementation of the embedded communication channel ECC. In a physical layer implementation of the embedded communication channel ECC, for example a pilot tone can be used. By using, for example a slow AM modulation scheme (10%, KHz range) available diagnostic I/F data can be imprinted on the embedded communication channel ECC.

In an alternative embodiment, the embedded communication channel ECC can be implemented on a protocol layer. For example, the embedded communication channel ECC can be provided on top of a service protocol. In a possible embodiment, a high speed capable integrated circuit can be provided in a data path to imprint the embedded communication channel ECC. Imprinting of the embedded communication channel ECC can, for example use of inter-frame gaps for creation of an overhead OH. The available digital diagnostic I/F data can be imprinted or transferred on the embedded communication channel ECC.

Figure 13:
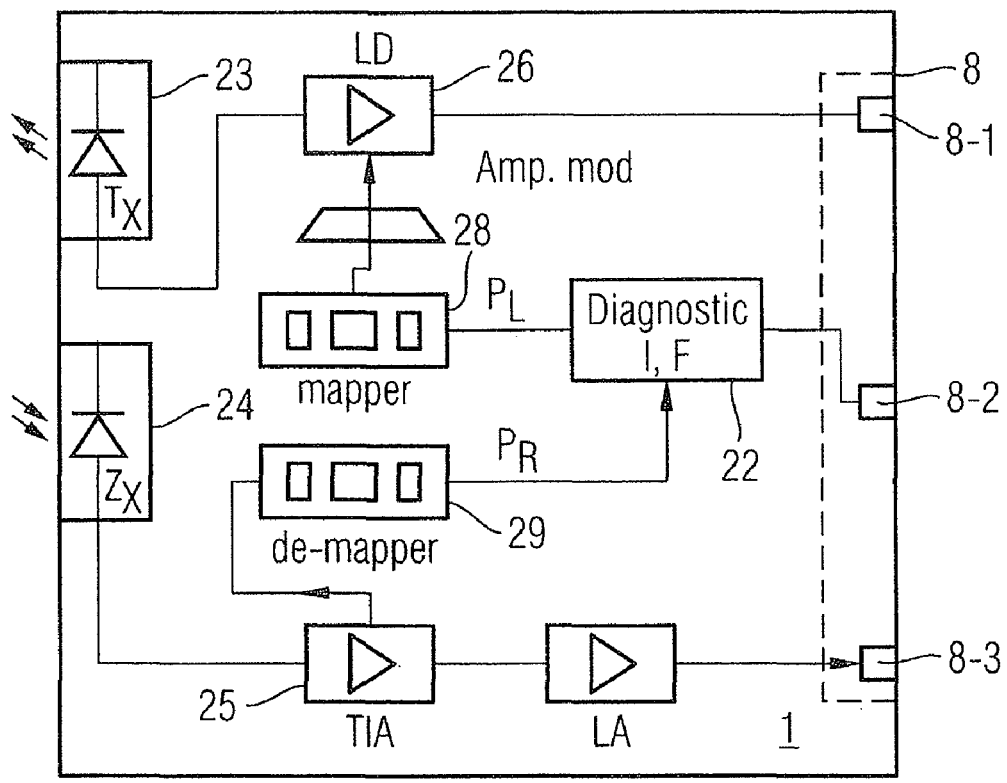
FIG. 13 shows a block diagram of a possible embodiment of a pluggable module according to the present invention.

FIG. 13 shows a possible embodiment for the pluggable module 1 comprising an embedded communication channel ECC. In the shown embodiment, the pluggable module 1 comprises a diagnostic unit 22 to receive local performance data and electronic components within the pluggable module 1. These electronic components comprise in the given example a transmission diode 23, a receiving diode 24, a transimpedance amplifier TIA 25, a laser driver 26 and a limiting or linear amplifier 27. On the backside of the pluggable module 1 the electrical interface 8 comprises a data transmission interface 8-1, an electrical reporting interface 8-2 and for the reception data path an electrical data reception interface 8-3. Furthermore, the pluggable module 1 comprises a mapping unit 28 which controls the laser driver 26 depending on local performance data received from the diagnostic unit 22 to transfer the performance data via the provided embedded communication channel ECC to a remote pluggable module 1.

As can be seen from FIG. 13, the pluggable module 1 further comprises a demapping unit 29 for storing performance data extracted from the embedded communication channel ECC in a memory of the diagnostic unit 22. The performance data can be extracted, for example at the transimpedance amplifier 25 and the embedded communication channel ECC can be provided by side band modulation of a data signal of the transported data stream. The diagnostic unit 22 receives local performance data from the electronic components 23, 24, 25, 26, 27, such as temperature T or power consumption P. In a possible embodiment, the diagnostic unit 22 reports the received local (near end) performance data and the received remote (far end) performance data transported via the embedded communication channel ECC via the electrical interface 8-2 to a controlling device of the host device 2 into which the pluggable module 1 is inserted. The electrical interface 8-2 can be formed in a possible embodiment by an $I^2C$ bus. In a possible embodiment, the performance data extracted at the transimpedance amplifier TIA comprises SFF 8472-performance parameters. In a possible embodiment, the diagnostic unit 22 comprises a memory for storing local performance data of the pluggable module 1 as well as the received and extracted performance data of remote pluggable modules.

Figure 14:
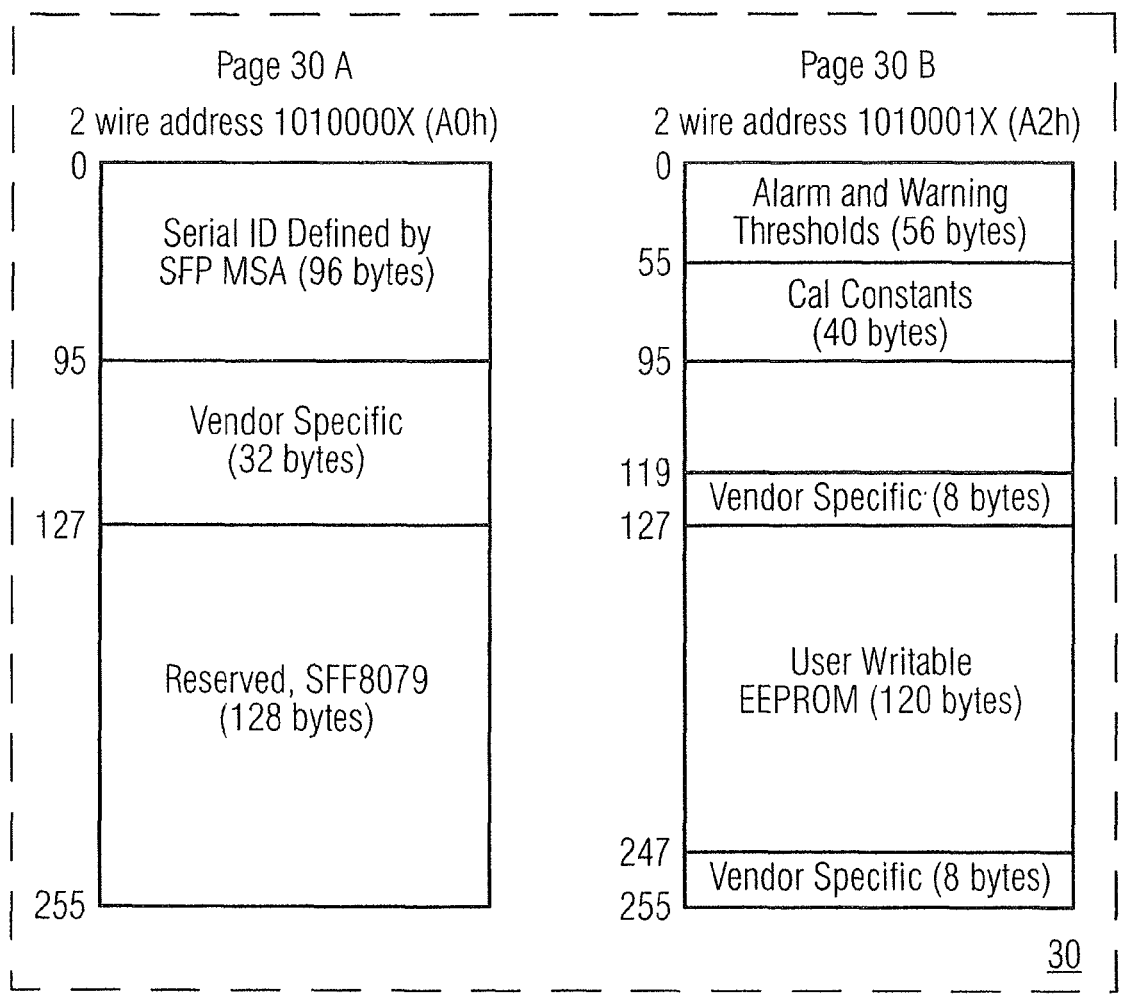
FIG. 14 shows a data structure of a memory within a pluggable module according to a possible embodiment of the present invention.

FIG. 14 shows schematically a memory content of a memory 30 within the diagnostic unit 22 as shown in FIG. 13. In the shown embodiment, the memory 30 is a SSF 8472-memory having a page 30A and a page 30B. As can be seen from FIG. 14, in the SSF 8472-memory unallocated bytes on page 30B are used for exchanging DMI (digital monitoring interface) performance data with a far end pluggable module 1. This memory space can be used for transferring data from the diagnostic unit 22 to the respective host device 2.

FIG. 15 shows the memory space page 30B for storing real time diagnostic interface data in more detail. Data bytes 96-105 are used for local near end parameter data. As can be seen from FIG. 15 data bytes 106-109 are unallocated data which can be used for transferring data via the embedded communication channel ECC to a far end pluggable module. In a possible embodiment, the parameter data is refreshed in a fixed time period interval, such as every five seconds.

As can be seen from FIG. 13, the mapping and demapping units 28, 29 are connected to a SFF 8472-diagnostic unit. The near end SSF 8472-data is read and written into the embedded communication channel ECC by the mapping unit 28. The embedded communication channel ECC is read and the far end SFF 8472-parameter data is extracted and written to the near end SFF 8472-unit 22. The data is written to a diagnostic SSF 8472-unit 22 which supports SSF 8472 programming pages, so that address space extensions can be avoided to prevent adaptions of the hardware and software of the host device 2. To meet space constraints within the SSF 8472-address space a proprietary TDM-mapping scheme can be supported to map such data sets into the address space.

In a possible embodiment of the pluggable module 1 according to the present invention, the pluggable module 1 performs near end and far end bidirectional performance monitoring.

Figure 16A:
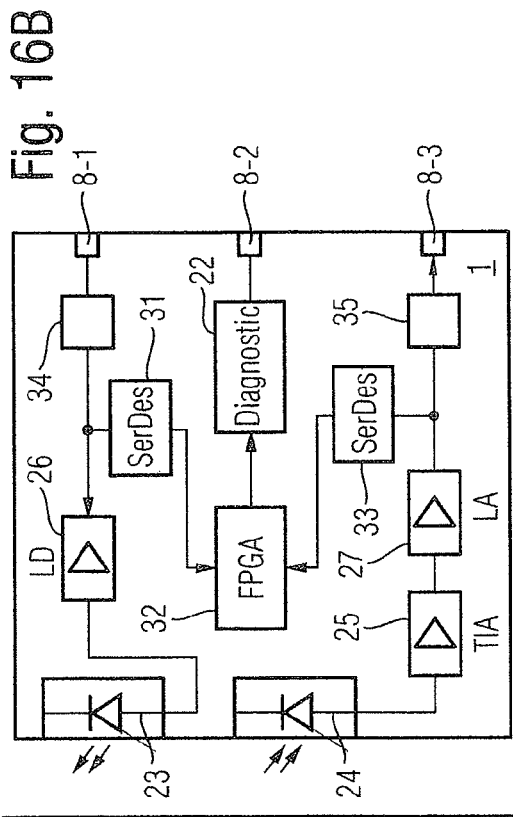
FIGS. 16A-16D show block diagrams of possible embodiments of the pluggable module according to the present invention.
Figure 16B:
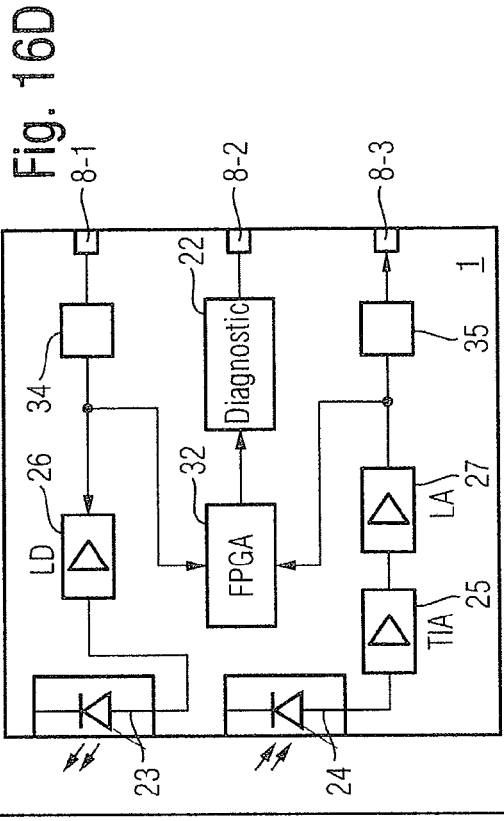
Figure 16C:
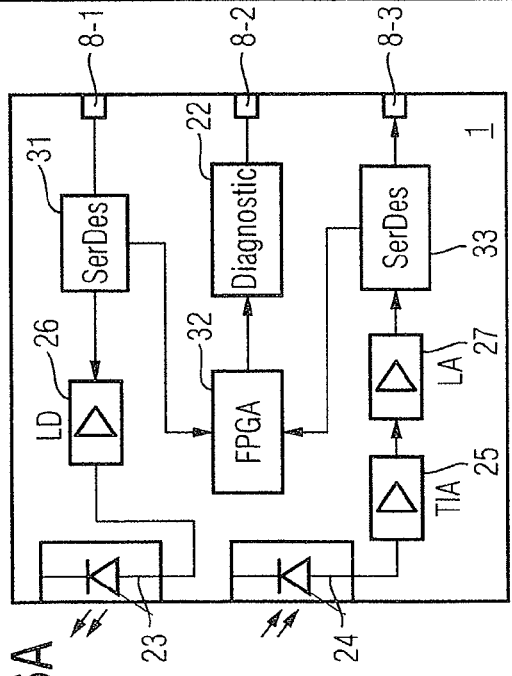
Figure 16D:
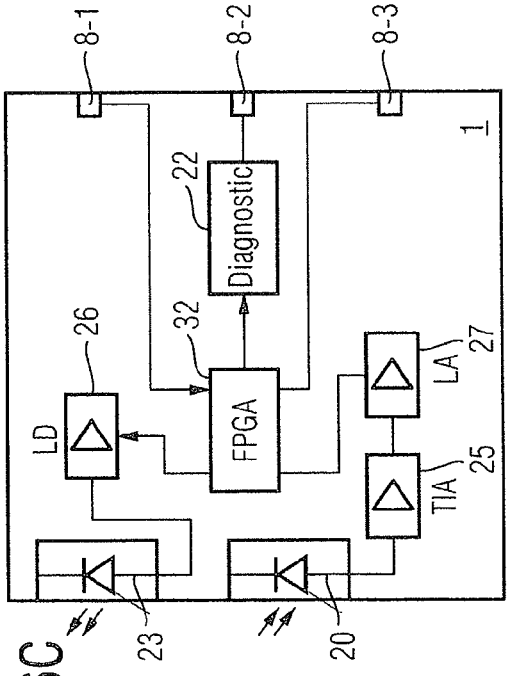

FIGS. 16A, 16B show embodiments employing parallel processing using SERDES (serial/deserializer). FIGS. 16C, 16D show embodiments of the pluggable module 1 employing serial processing using high speed FPGA-interfaces. As can be seen from FIG. 16A, a SERDES (serial/deserializer) 31 is provided for supplying data from a transmit data path to data processing circuit 32 such as a field programmable gate array. The data processing circuit 32 can also be formed by an ASIC, EPLD or CPLD.

A further SERDES (serial/deserializer) 33 is provided for supplying data from a reception data path of said pluggable module 1 to the FPGA 32.

The digital performance monitoring is provided for observing data streams. The SERDES 31, 33 are provided for parallizing a high speed signal into a number of low speed data streams.

In the embodiments shown in FIGS. 16C, 16D the SERDES 31, 33 are incorporated in the FPGA 32. In the embodiment shown in FIG. 16A the SERDES 31, 33 are provided within the data path and have high speed in- and out-interfaces for the local speed data streams. In the embodiment as shown in FIG. 16B the SERDES 31 has a high speed in-interface for a signal which is forwarded as a low speed data stream to the FPGA 32. The FPGA 32 as shown in FIGS. 16A, 16B is provided for performing performance monitoring. The FPGA 32 is connected to the diagnostic unit 22 of the pluggable module 1. In a possible embodiment, the FPGA 32 increments at least one performance counter provided in a memory 30 of the diagnostic unit 22 depending on a measured performance indicator. In a possible embodiment, the performance indicator can be formed by a BER (bit error rate), a CV (coding violation) or by frame drops.

Figure 17:
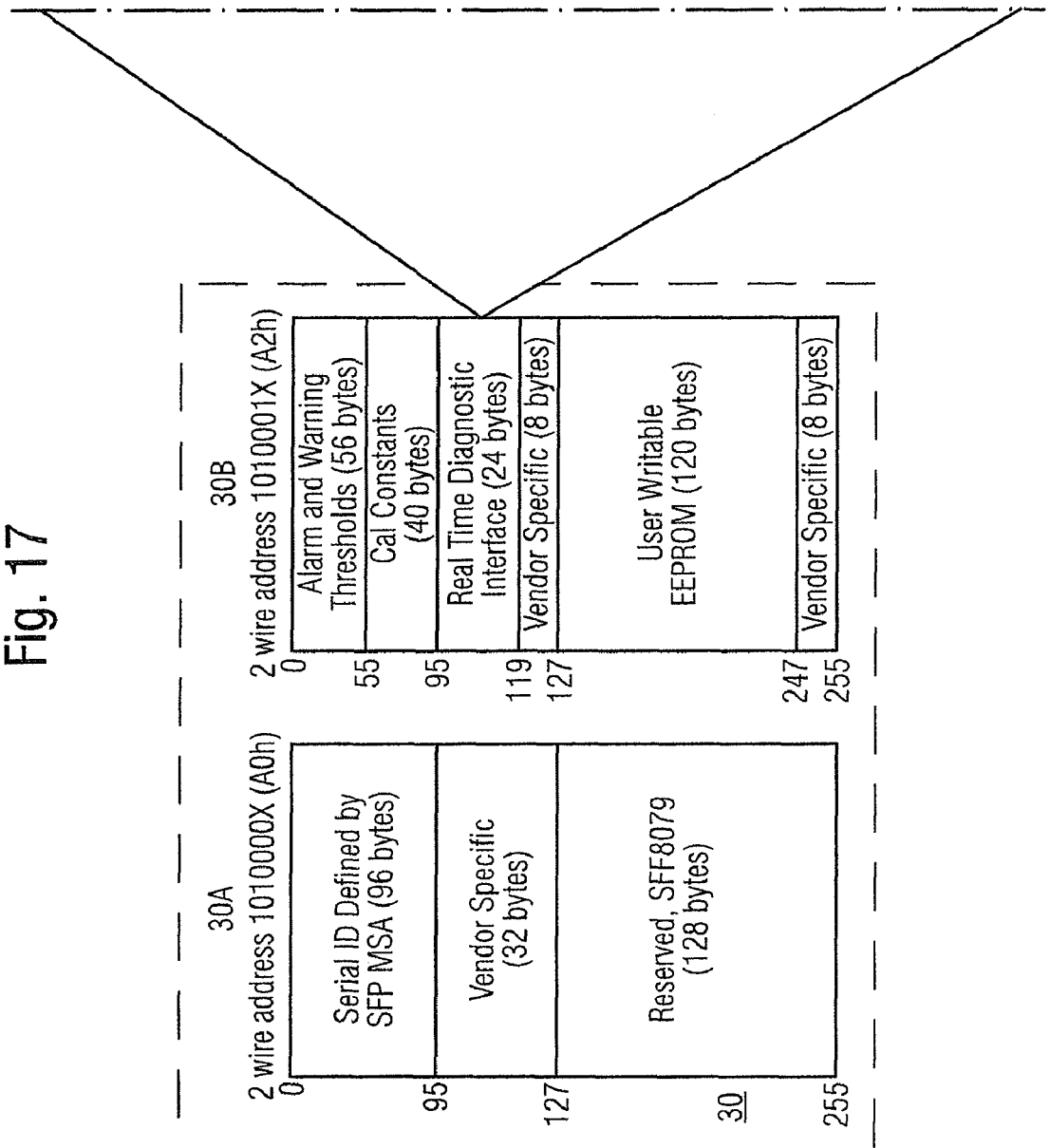
FIGS. 17A, 17B show examples of data structures of a memory within possible embodiments of the pluggable module according to the present invention.
Figure 17B:
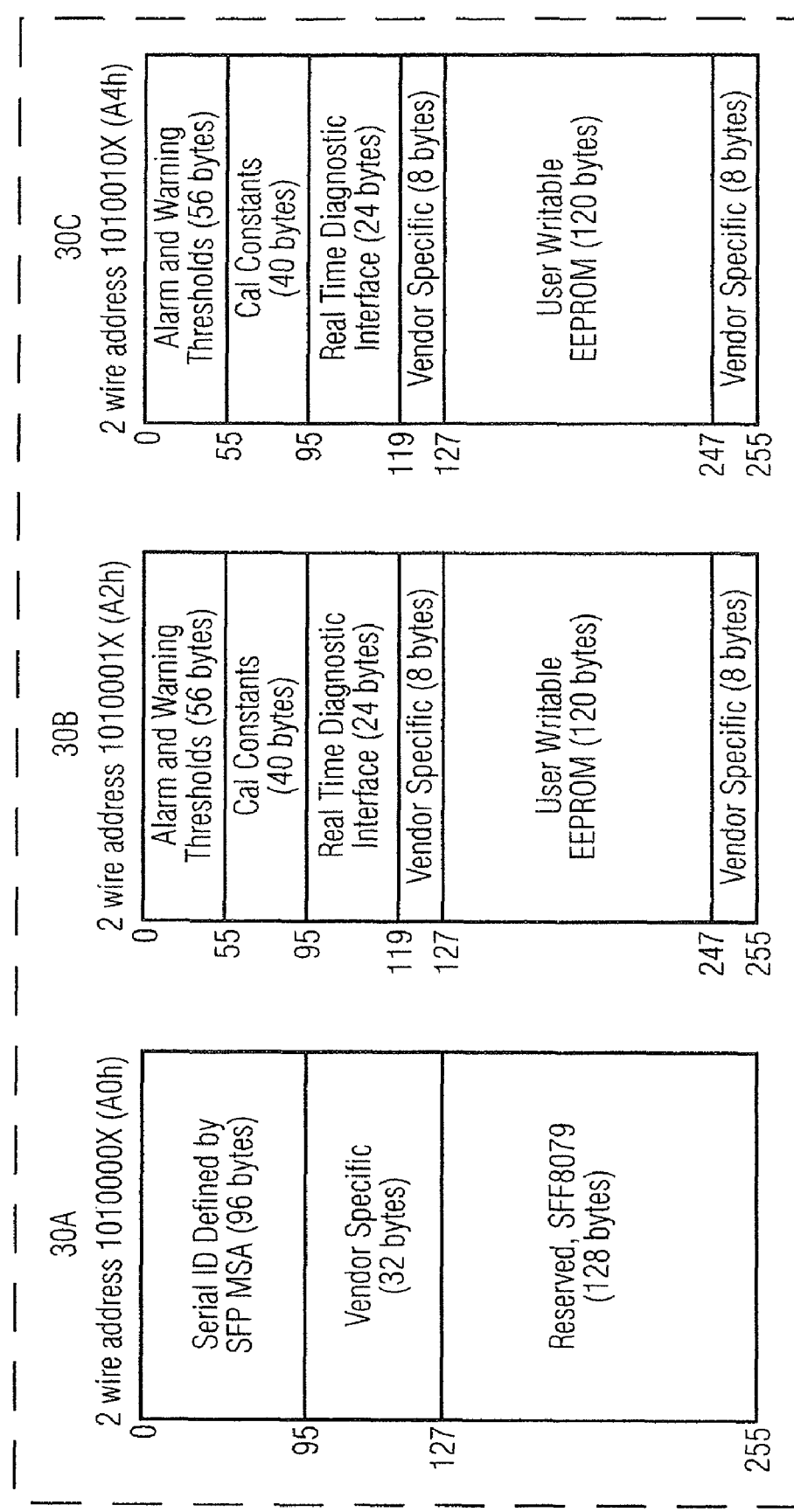

FIGS. 17A, 17B show different possibilities to read out data using a memory 30 within the diagnostic unit 22. In the embodiment as illustrated by FIG. 17A, free memory space of the memory 30 as shown in FIG. 14 is used to read out data.

In the embodiment as illustrated in FIG. 17B, an additional programming page 30C is provided to read out performance data.

In a possible embodiment, the memory 30 within the diagnostic unit 22 is a SFF 8472-memory comprising unallocated bytes used for an ES (error seconds), a SES (severe error seconds) a UAS (Unavailable Seconds) and a BER (Bit Error Rate) performance counter.

Figure 18A:
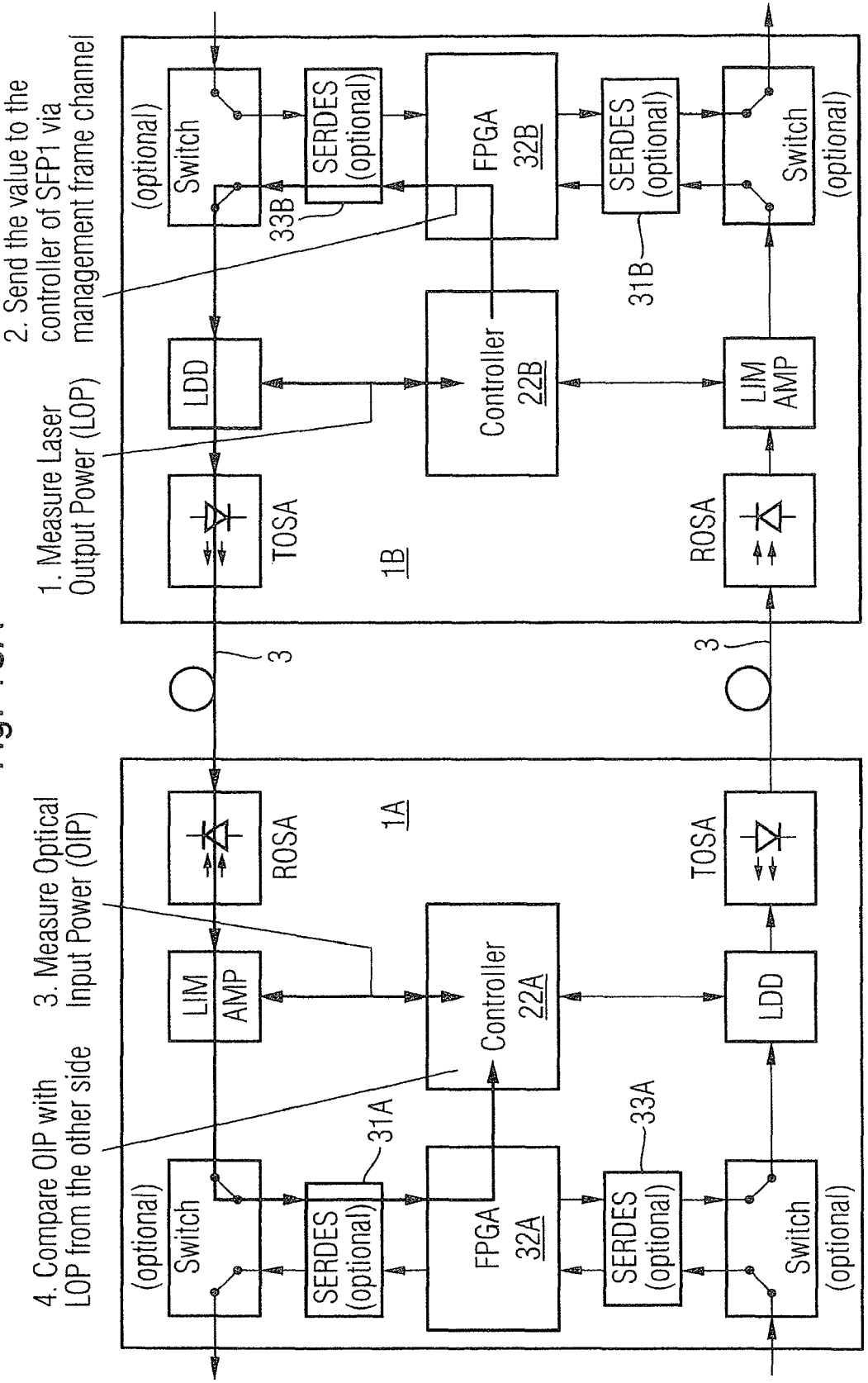
FIGS. 18A, 18B illustrate possibilities of line attenuation measurements performed by the pluggable module according to the present invention.

FIG. 18A illustrates a possibility of a line attenuation measurement which can be performed as performance monitoring by the pluggable module 1 according to the present invention. In the shown embodiment, the communication is performed via a management channel inside of a frame. First, the controller 22B measures the laser output power in the given example. Then the FPGA 32B of the pluggable module 1B sends the measured value of the controller 22B via a management frame channel to the other pluggable module 1A. In a further step, the controller 22A of the pluggable module 1A measures an optical input power (OIP) and compares then the optical input power with the laser output power (LOP) from the other side.

Figure 18B:
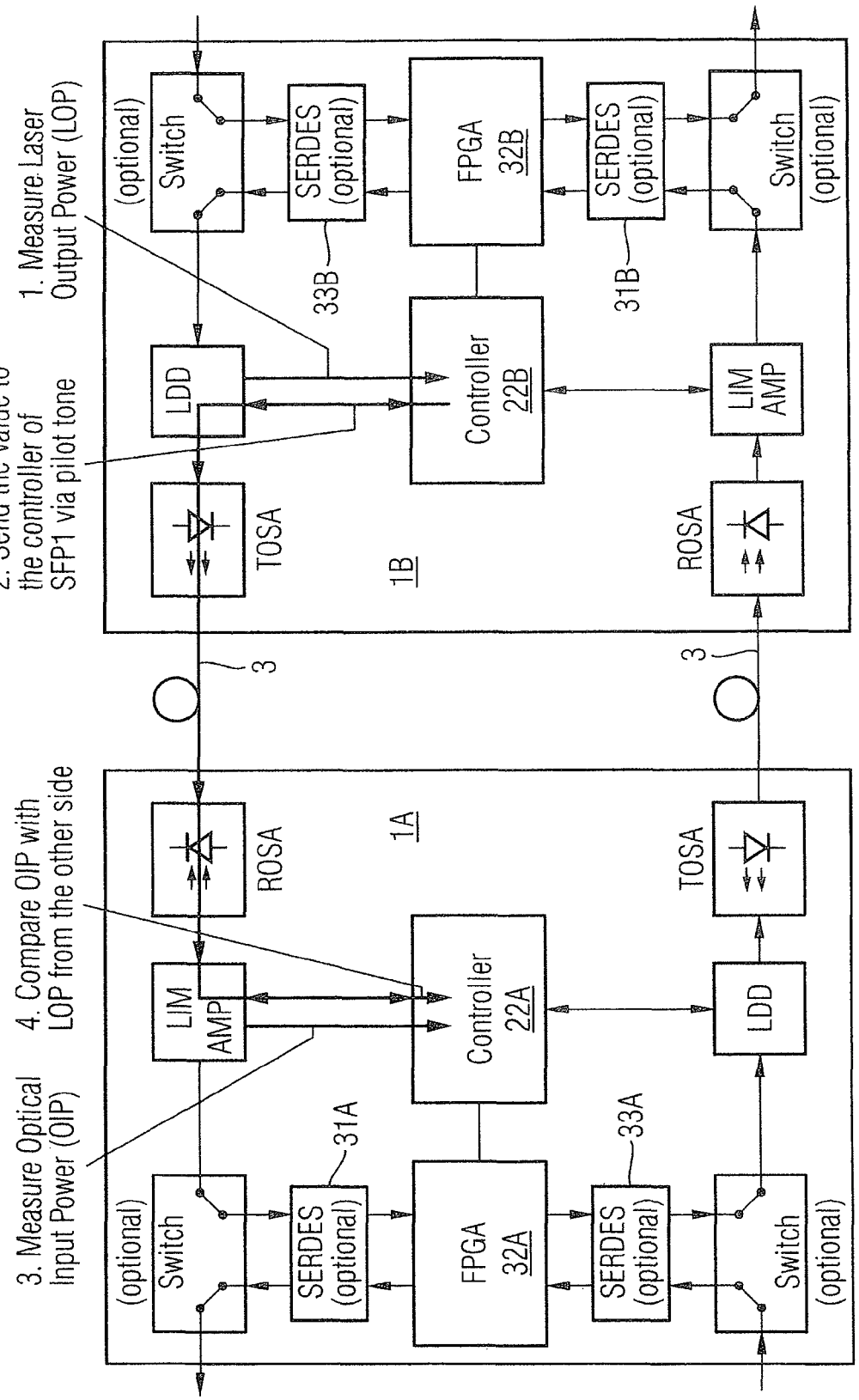

FIG. 18B shows a further possible embodiment for measuring a line attenuation. First, a laser output power (LOP) is measured. Then, the pluggable module 1B sends the measured value of the laser output power (LOP) to the other pluggable module 1A. The pluggable module 1A compares the received value with its optical input power so that the local FPGA 32A can analyze the attenuation of the link. For monitoring the line attenuation, the start value of attenuation (at the start-up of the line first time) can be compared with the current measurement value of attenuation. Now it is possible to calculate a line attenuation for a time and to monitor if sudden changes occur. In an embodiment, a communication is performed via a pilot tone. In an alternative embodiment, the communication is performed via a management channel inside a frame.

Figure 19:
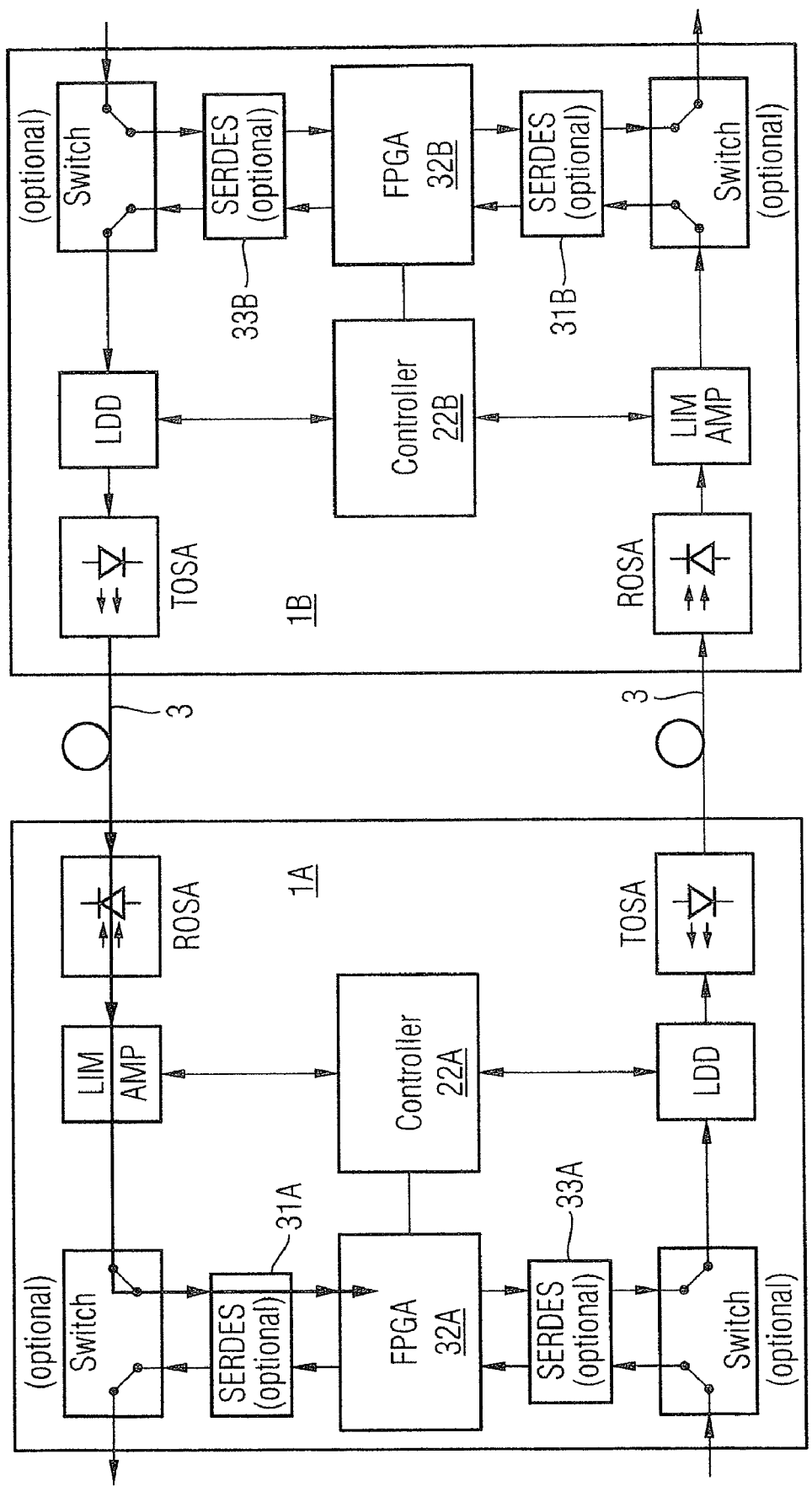
FIGS. 19, 20 illustrate a performance monitoring as performed by the pluggable module according to the present invention.
Figure 20:
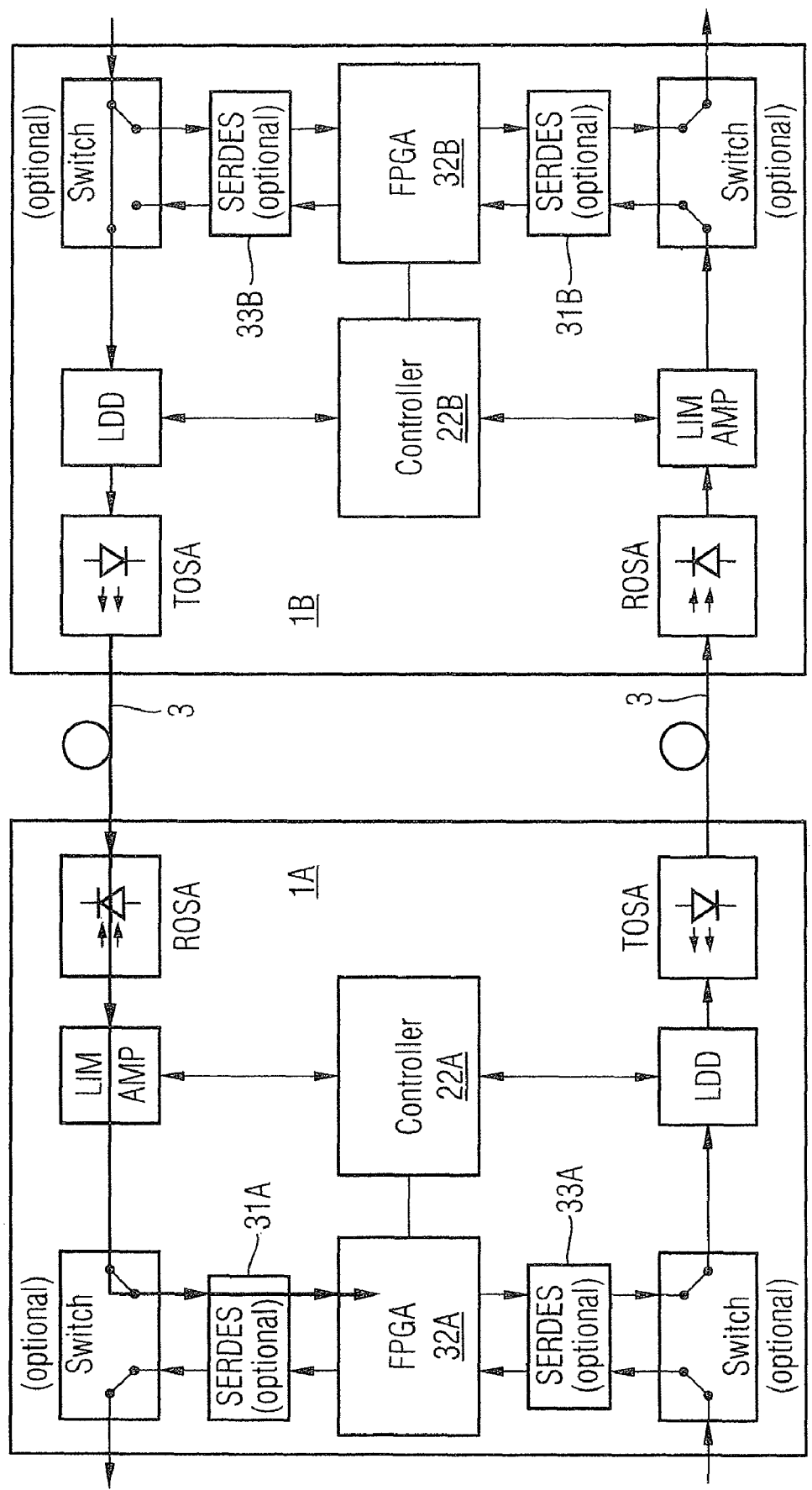

FIGS. 19, 20 illustrate performance monitoring by a pluggable module 1 according to the present invention. The FPGA 32 is provided in the data path for monitoring the data path. The FPGA 32B detects with the help of SERDES various frame properties, such as running disparity, simple disparity, code error or a disparity error.

Figure 21:
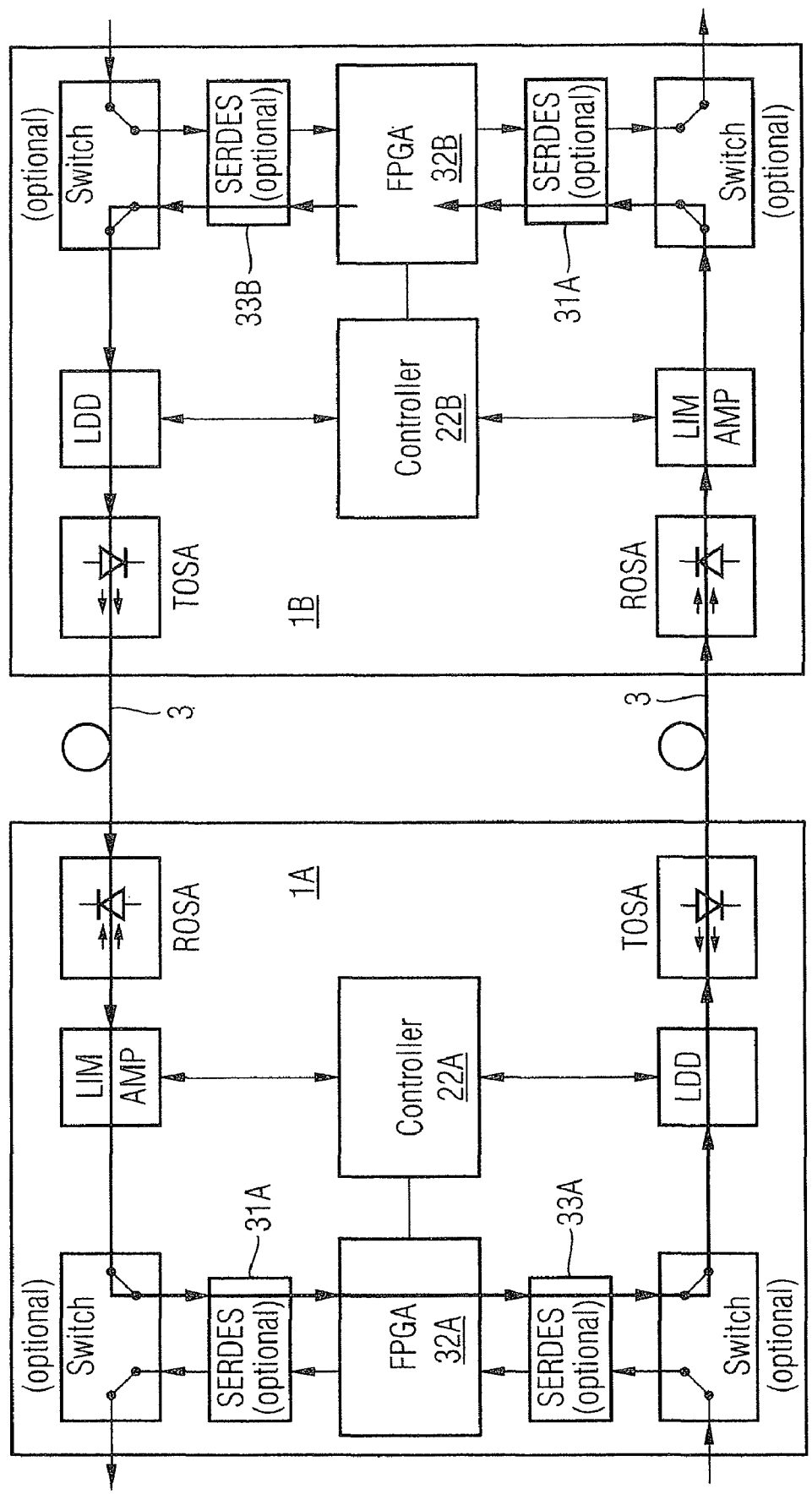
FIG. 21 illustrates a PRBS (Pseudo Random Bit Sequence)-test as performed by a pluggable module according to the present invention.

FIG. 21 illustrates a PRBS (Pseudo Random Bit Sequence) test. In a possible embodiment, the line is analyzed by variation of a PRBS sequence, wherein two various operations can be provided. In a PRBS-loop test as illustrated by FIG. 21, the FPGA 32B of pluggable module 1B sends a PRBS-sequence to the FPGA 32A of the pluggable module 1A. The FPGA 32A of the pluggable module 1A loops the signal. The FPGA 32B of the pluggable module 1B then receives its own PRBS-sequence and can analyze it and can calculate a line quality.

Figure 22:
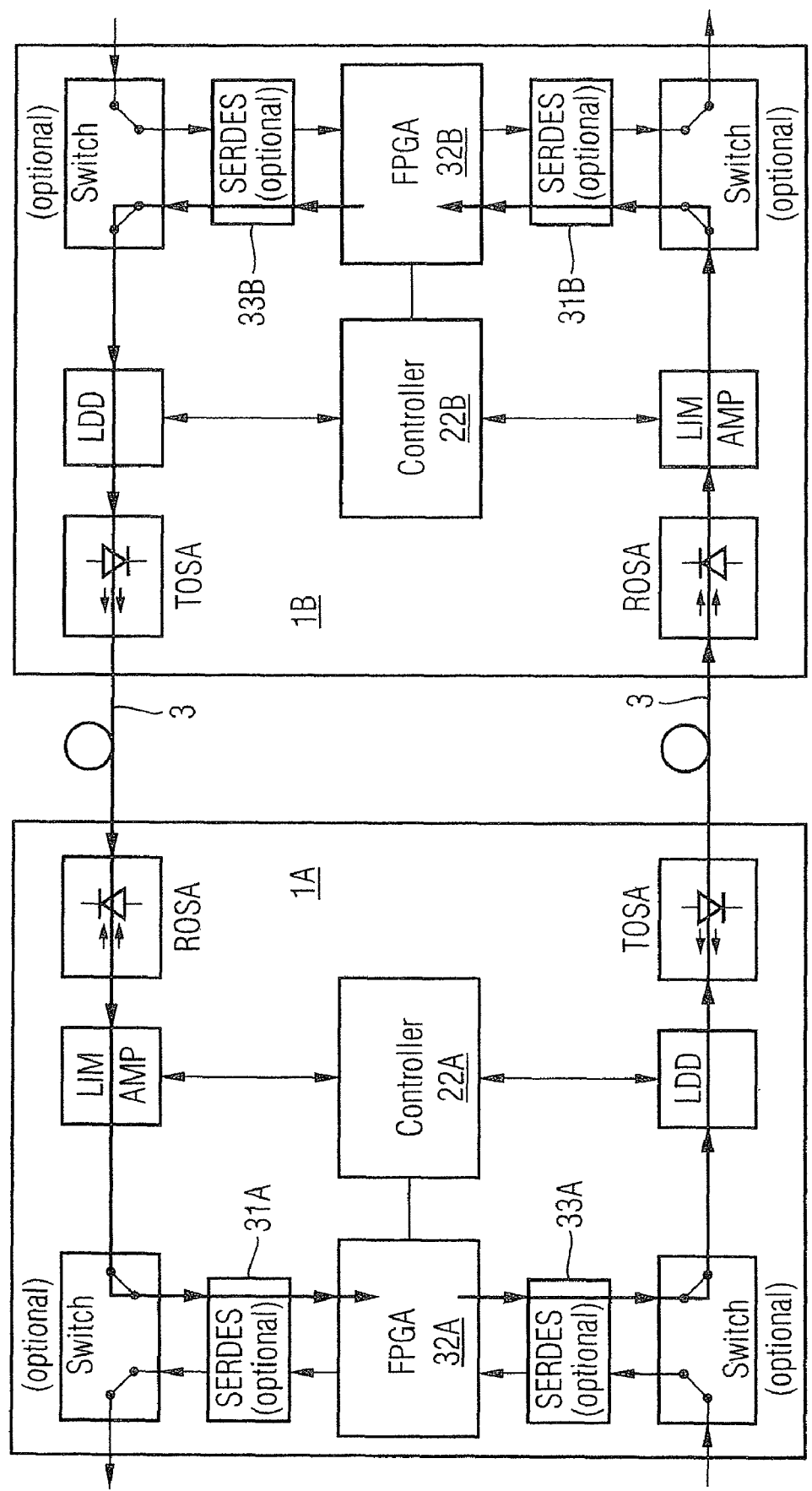
FIG. 22 shows a variant of a PRBS (Pseudo Random Bit Sequence)-test as performed by a pluggable module according to the present invention.
Figure 23:
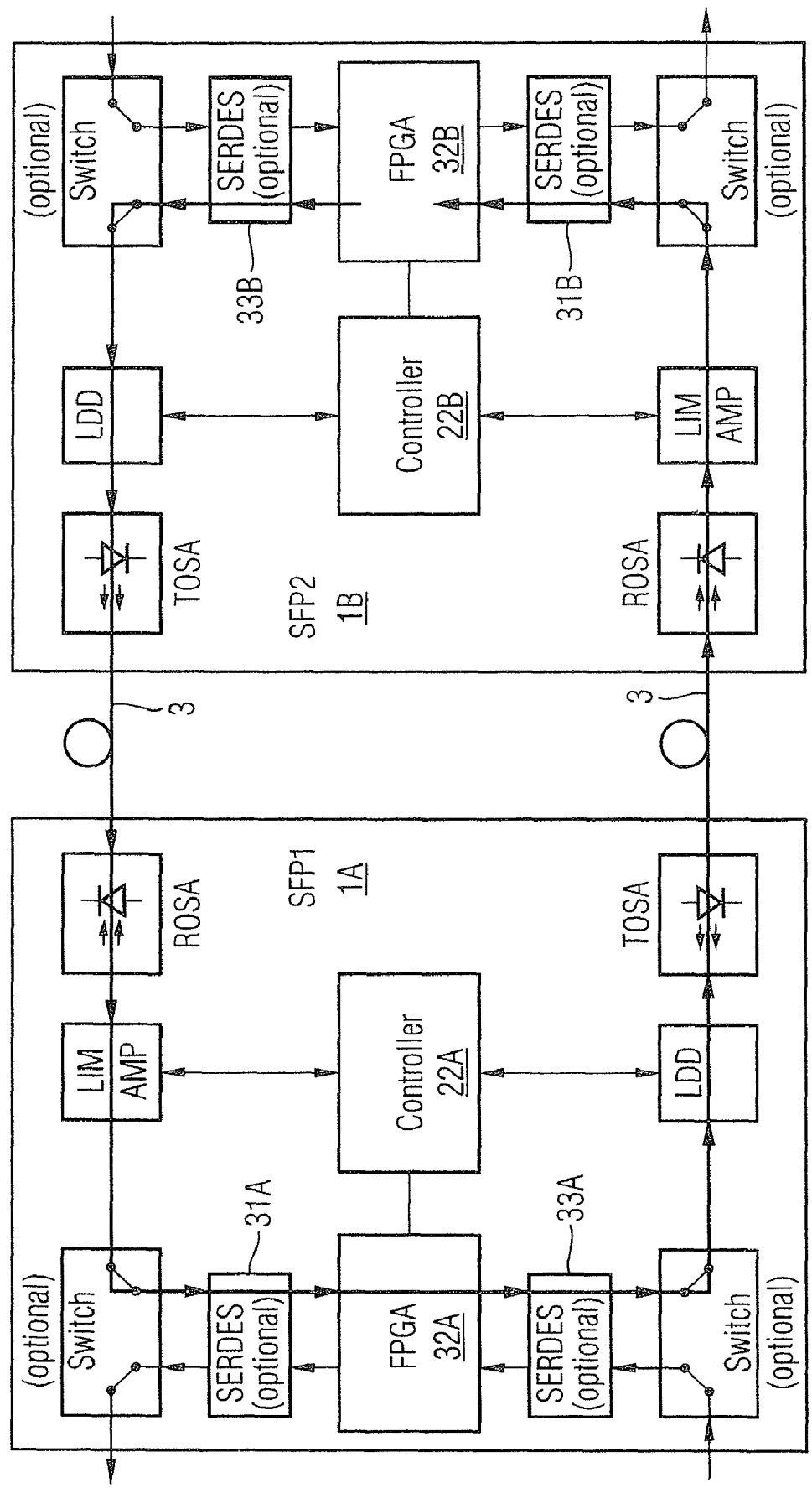
FIG. 23 shows a further embodiment of the pluggable module according to the present invention.

FIG. 22 illustrates a second operation variant for analyzing a line by variation of a PRBS-sequence. In this variant, a separate PRBS-test is performed, i.e. a PRBS-test is performed for each separate line. The FPGA 32A of pluggable module 1A sends a PRBS-sequence to the FPGA 32B of the other pluggable module 1B. Then, the FPGA 32B of pluggable module 1B analyzes the received PRBS-sequence. The same procedure is possible the other way around, i.e. the FPGA 32B of the pluggable module 1B sends the PRBS-sequence to the FPGA 32A of the pluggable module 1A. This is provided for measurements of a line delay (line length). In a line delay loop test FPGA 32B of pluggable module 1B sends a special identifier to the FPGA 32A of the pluggable module 1A. The FPGA 32A of the pluggable module 1A loops the received signal. Then, the FPGA 32B of the second pluggable module 1B receives the special identifier after a line delay time so that it can be analyzed and calculates the line length.

In a possible embodiment, the pluggable module 1 performs a latency measurement of a latency for transporting data from the pluggable module 1 to a far end pluggable module 1'. The measurement can be performed dynamically and without affecting data transmission. In a possible embodiment, the near end pluggable module writes a byte x a time T1 into a signal overhead the far end pluggable module 1 extracts the byte X and writes it to an overhead byte Y at the far end transmitter. The near end pluggable module reads the received byte Y by extracting the T1-time stamp at the time T2. The total delay time is T2−T1. Accordingly, the measured one way latency is T=0.5*(T2−T1).

In a possible embodiment, the latency T is written to the SFF 8472. In an embodiment, the measurement procedure is performed symmetrically, i.e. latency T is available as a dynamical in-service measured parameter at the near end side and at the far end side.

The measurement of the latency T is necessary to fulfil service level agreements (SLA). The latency T sometimes causes protocol buffering to manage protocol throughput, for example in a fibre channel protocol.

In a further embodiment of the pluggable module 1 according to the present invention, the pluggable module 1 performs a link test. A link test is an initialization procedure that takes place before data transmission between host devices 2 is established. A received latency parameter at the far end pluggable module can be evaluated as a link test indication. The purpose of the link test is that it allows to set up and to verify an optical link between two pluggable modules 1 independently from the availability of host data.

In an embodiment of the pluggable module 1 according to the present invention, the pluggable module 1 performs a protocol mapping to transport protocols.

The pluggable module 1 performs a bidirectional protocol mapping between an application protocol and a transport protocol. The application protocol can be formed by an Ethernet protocol, a fibre channel protocol, an InfiniBand protocol or an uncompressed video/audio protocol. The Ethernet protocol can comprise Ethernet protocols of different variants, in particular, Ethernet protocols having different data rates. The transport protocols can comprise SDH protocols with different data rates, such as STM1, STM4, STM16, STM64 or SONET protocols with different data rates, such as OC3, OC12, OC48, OC196.

In a possible embodiment, the protocol mapping performed by the pluggable module 1 is configurable. In a possible embodiment, the transport protocols comprise OSI-layer 1, OSI-layer 2 and OSI-layer 3 protocols. The protocol mapping allows a bidirectional conversion between different types of protocols, such as Ethernet to SDH.

In a possible embodiment, the data traffic is mapped, i.e. payload mapping, OH-termination. In an alternative embodiment, a management mapping is performed, i.e. a data protocol conversion is performed.

Figure 24:
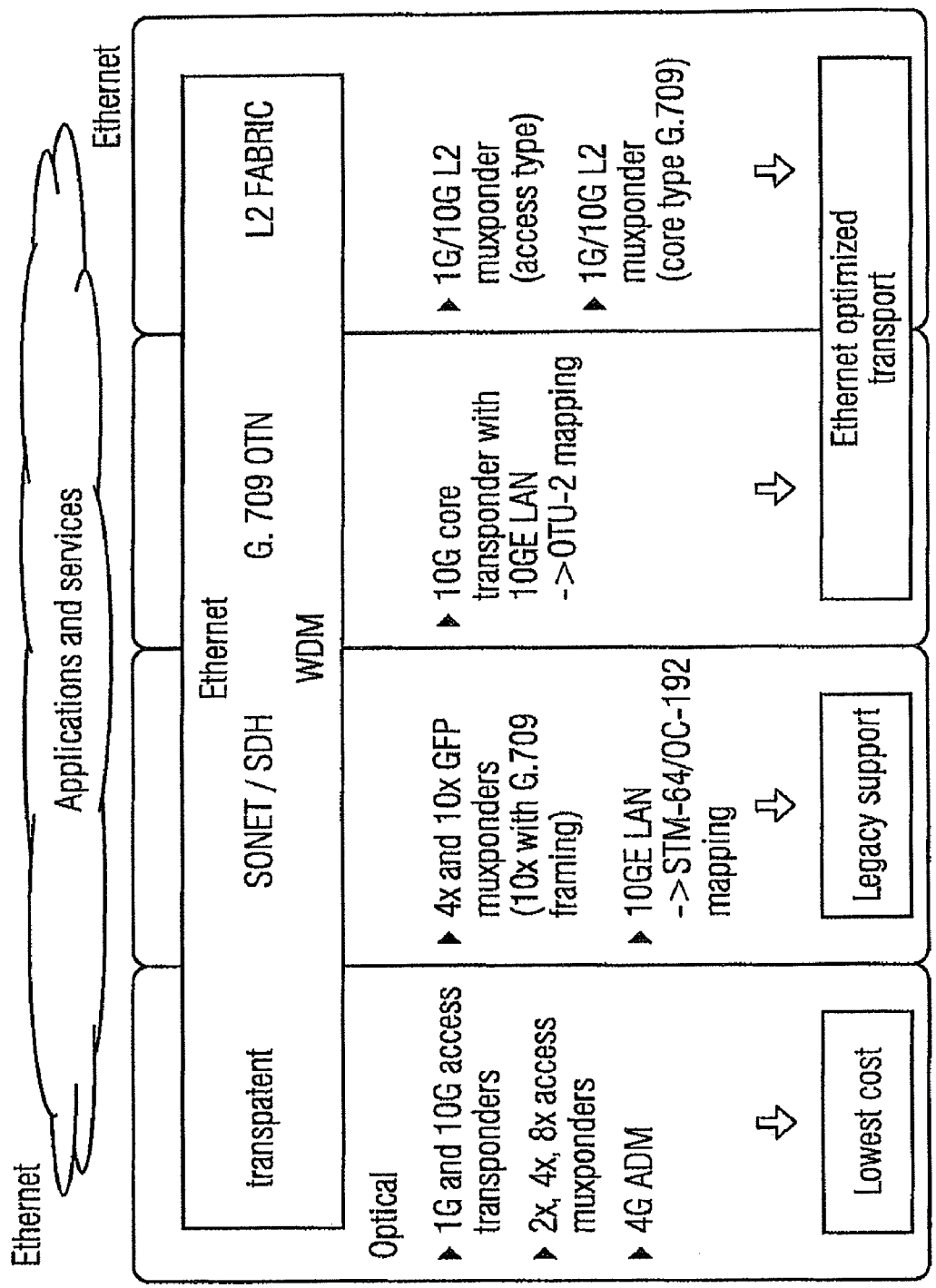
FIG. 24 illustrates an example for protocol mapping performed by the pluggable module according to the present invention.
Figure 25:
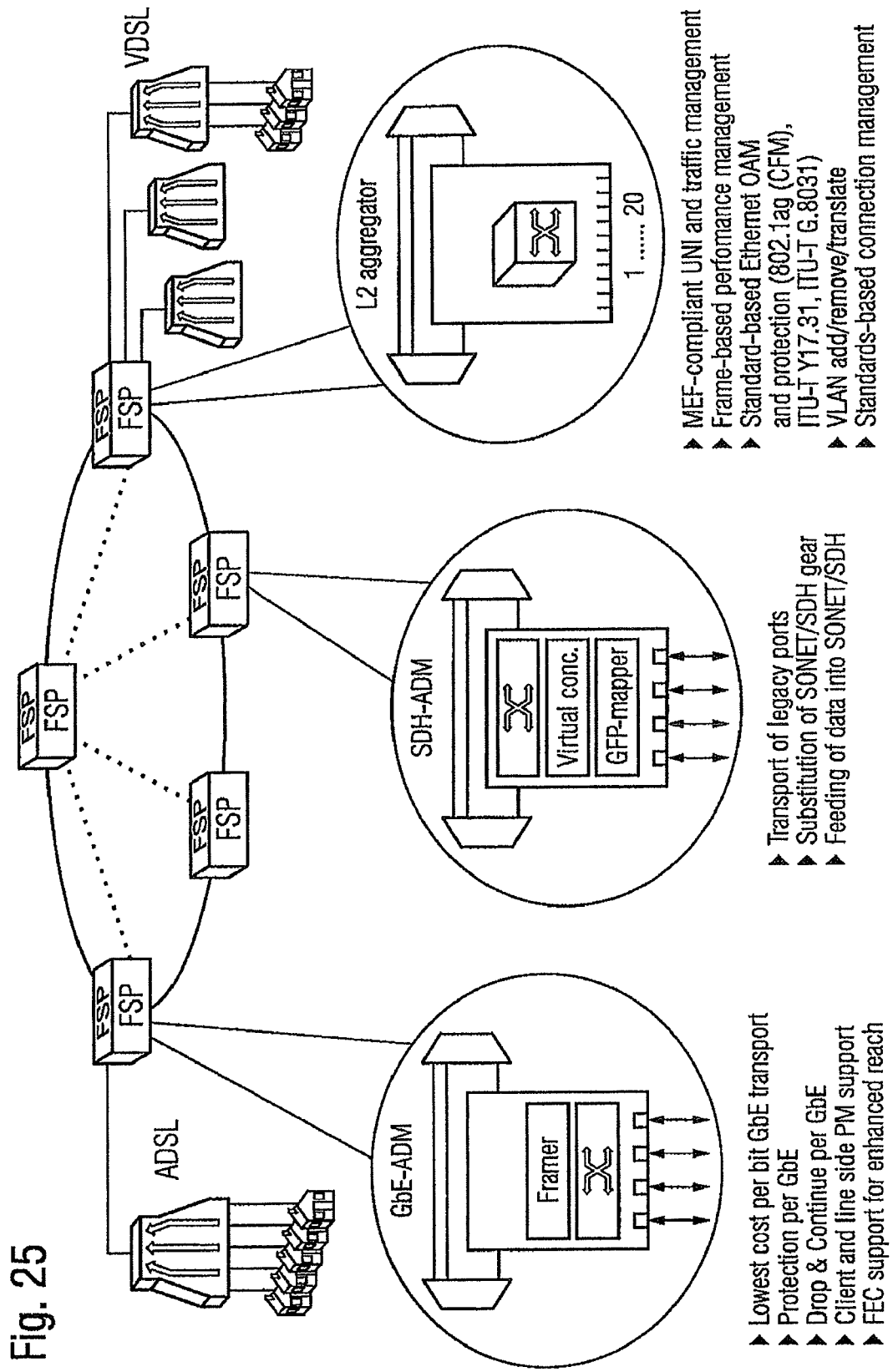
FIG. 25 illustrates possible implementations of protocol mapping functions by a pluggable module according to the present invention.

FIG. 25 illustrates an example of a network according to the present invention. Optical transport systems (FSP) are connected to each other in a ring structure. The ring structure can, for example be formed by two optical fibres. The network as shown in FIG. 24 comprises as a data transport system a GbE-add-drop-multiplexer, a transport system with an SDH-add-drop-multiplexer and a transport system with an L2 aggregator unit. The transport systems FSP as shown in FIG. 25 can provide a protocol mapping PM between application protocols and transport protocols. For example, as shown in FIG. 25, the SDH-add-drop-multiplexer comprises a GFP mapping unit for performing GFP (Generic Framing Procedure) mapping of user data into containers of a transport protocol. Furthermore, the SDH-add-drop-multiplexer as shown in FIG. 25 comprises a concatenation unit to perform a concatenation of the containers to transport protocol frames each consisting of a header and payload. Accordingly, a feeding of data into transport protocol frames, such as SONET or SDH is performed.

In a possible embodiment of the pluggable module 1 according to the present invention the pluggable module 1 provides a mapping of Ethernet data to SDH by means of ITU-TG.7041 generic framing procedure GFP as well as mapping of IEEE 802.3 IEEE EFM management data to ITU-TG.707 SDH managent channels, such as F1 or D1 to D12. The pluggable module 1 according to the present invention is MSA compatible. In particular, the pluggable module 1 comprises a MSA compatible low-power consumption. In a possible embodiment, the protocol mapping PM is performed by a FPGA unit such as the FPGA 31 shown in FIGS. 16A to 16D. In an alternative embodiment, the protocol mapping is performed by an ASIC.

In an embodiment of the pluggable module 1 according to the present invention as employed by the network, the integrated protocol mapping unit integrated within the pluggable module 1 has a power consumption of less than 500 mW.

Figure 26:
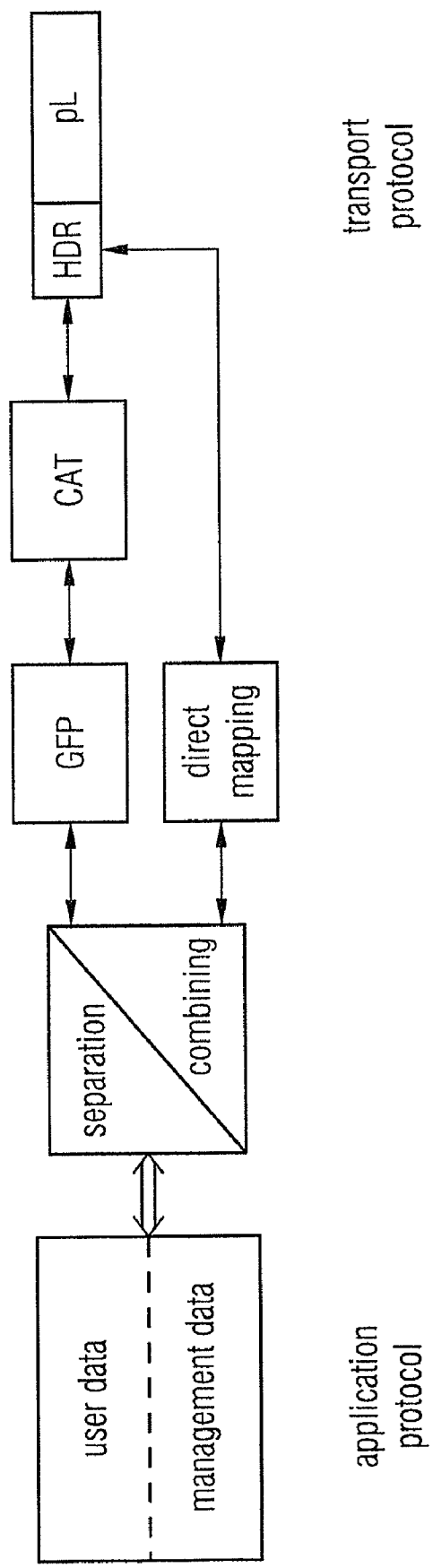
FIG. 26 shows a diagram for illustrating a protocol mapping as performed by a pluggable module according to the present invention.
Figure 27:
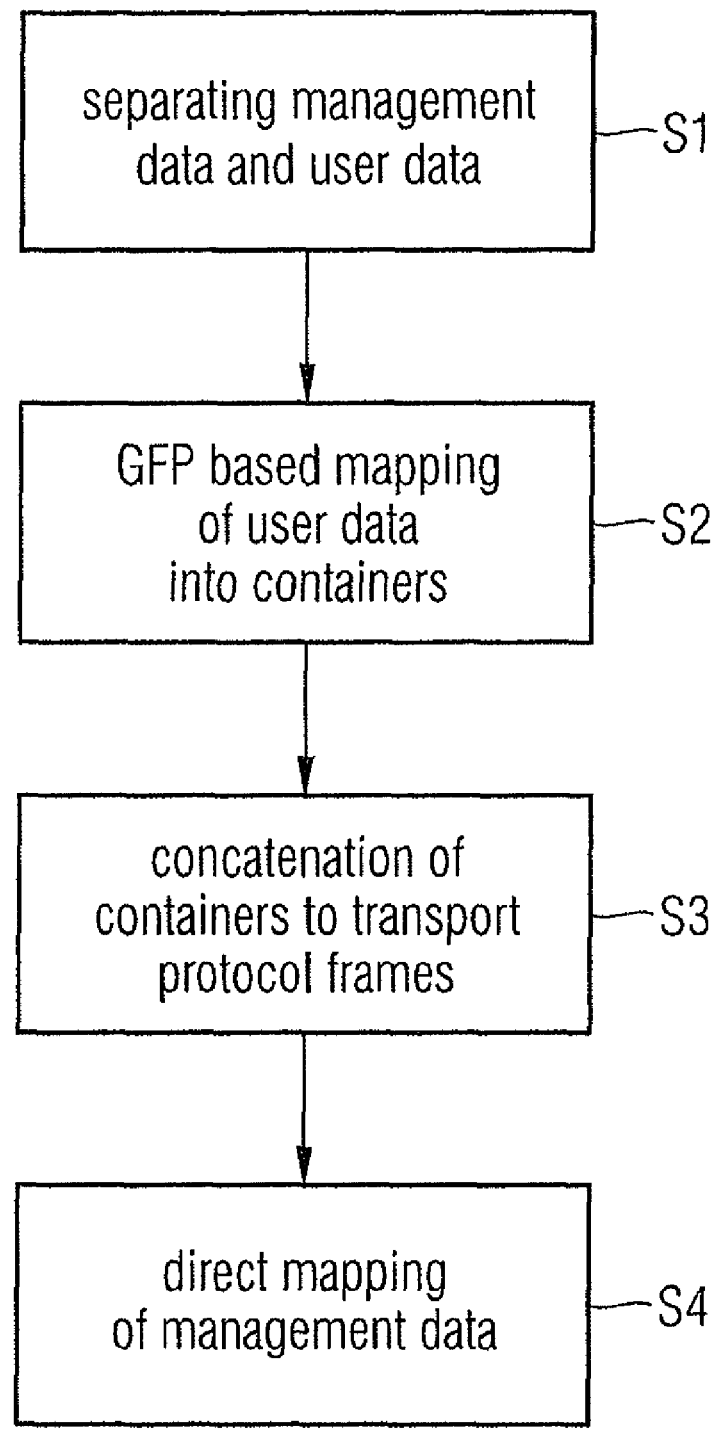
FIG. 27 shows a flowchart for illustrating a mapping from an application protocol to a transport protocol as performed by a pluggable module according to the present invention.

FIG. 26 illustrates a protocol mapping PM as performed within a pluggable module 1 according to the present invention. An application protocol, such as Ethernet, comprises user data and management data, such as EFM (Ethernet First Mile). To perform a protocol mapping PM from the application protocol, such as Ethernet, to a transport protocol, such as SDH, the following steps are performed as shown in the flowchart of FIG. 27. In a first step S1, the management data, such as EFM management data is separated from the other data of the application protocol. In a second step S2, a GFP (Generic Framing Procedure) mapping of the user data into containers of said transport protocol is performed. Said containers can be virtual containers (VC) of transport protocols, such as SDH. In a further step S3, the containers are concatenated with each other to generate transport protocol frames. In a possible embodiment, the concatenation comprises a virtual concatenation (VCAT). In an alternative embodiment, the concatenation comprises a contiguous concatenation (CCAT). FIG. 26 shows a transport protocol frame with header data HDR and payload PL. In a further step S4, a direct mapping of the management data of the application protocol into the headers of the transport protocol frames is performed.

The power consumption of the performed protocol mapping is a MSA compatible low-power consumption. The SDH-add-drop-multiplexer comprises means for performing GFP (Generic Framing Procedure) mapping and means for virtual concatenation VCAT which performs a concatenation of containers and transport protocol frames each consisting of a header and payload.

Figure 28:
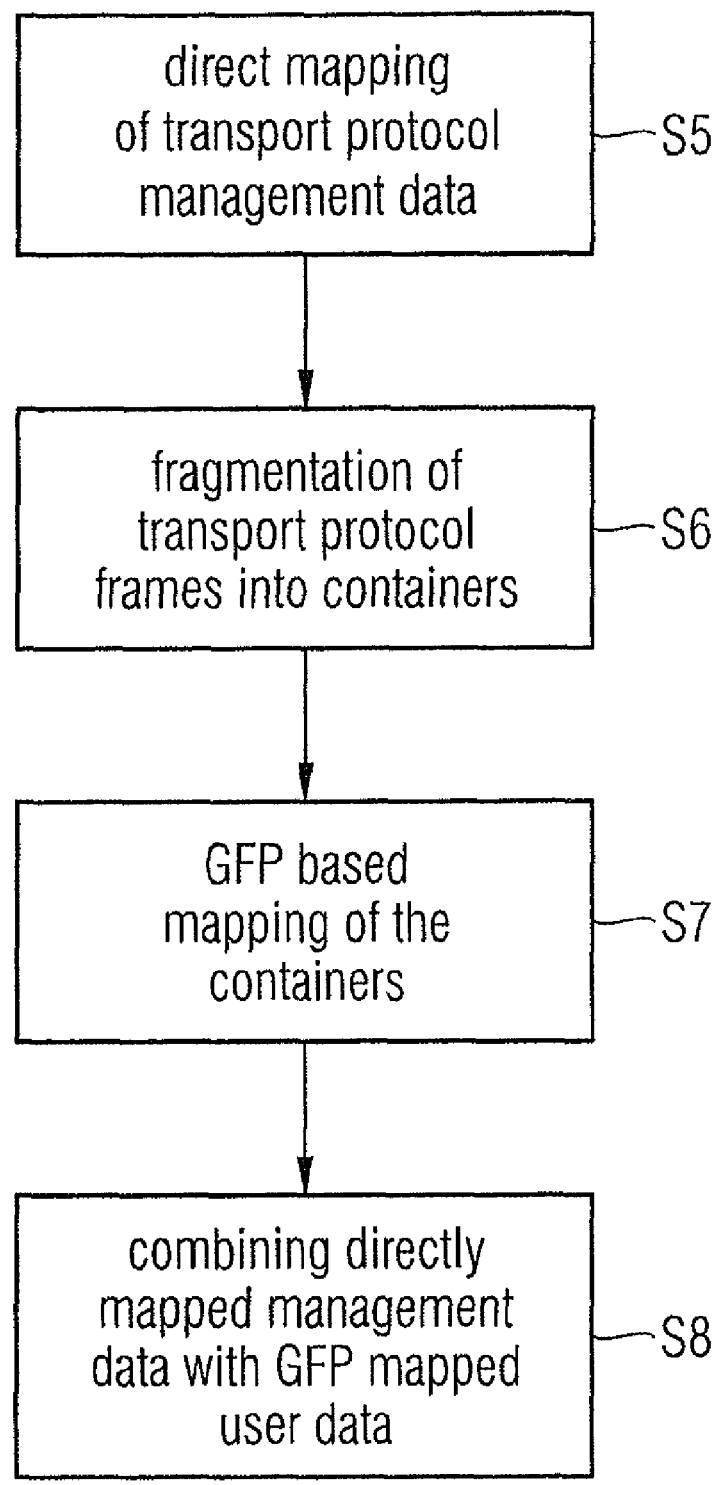
FIG. 28 shows a flowchart for illustrating a mapping from a transport protocol to an application protocol as performed by a pluggable module according to the present invention.

In a possible embodiment, a direct mapping of EFM management data is performed into header data of an SDH transport protocol frame, in particular, into the SDH D1 channel. The integrated protocol mapping unit of the pluggable module 1, such as an FPGA not only performs a protocol mapping PM from an application protocol to a transport protocol, but also a protocol mapping from a transport protocol to an application protocol as indicated in the flowchart of FIG. 28. In step S5 a direct mapping of transport protocol management data provided within headers of the transport protocol frames to management data of the application protocol is performed. In a further step S6, the transport protocol frames are fragmented into containers of the transport protocol. In a step S7, a GFP (Generic Framing Procedure) based mapping of the generated containers into user data of the application protocol is performed. Finally, in step S8, the directly mapped management data is combined with the GFP mapped user data. As shown in FIGS. 26 to 28 PM, protocol mapping PM between the application protocol and the transport protocol is bidirectional.

In a possible embodiment, an extraction of protocol monitoring parameters is automatically performed during said protocol mapping PM. These protocol monitoring parameters can indicate in a possible embodiment variants of the employed application and transport protocols. Extracted protocol monitoring parameters are supplied in a possible embodiment to the respective host device.

In a possible embodiment of the present invention, a ITU-TG.7041 GFP is supported within a transceiver integrated in the pluggable module 1. This is performed by mapping of Ethernet or fibre channel data traffic within the transceiver and virtual concatenation VCAT to SDH transport protocol frames.

In an alternative embodiment, a mapping of Ethernet management data which are provided in the host device EFM into SDH management channels, such as D1 to D12 or F1 or vice versa is performed. With the method according to the present invention, there is no need for specific blades within SDH or Ethernet apparatuses which support protocol mapping. With the network according to the present invention, the protocol mapping functions are integrated into the pluggable module 1 which is MSA compatible. Furthermore, in a possible embodiment, the pluggable module 1 according to the present invention allows a simple inband management connection between SDH and Ethernet devices.

In a possible embodiment of the pluggable module 1 at least one embedded communication channel ECC is provided which exchanges performance monitoring data and configuration data between the pluggable module 1 and a far-end device.

With the method and system according to the present invention it is not only possible to adapt a transceiver on the physical level but also on higher protocol layers.

In a possible embodiment of the pluggable module 1 according to the present invention, the pluggable module 1 can also provide a time slot based add/drop functionality between the optical network interface and an electrical host interface 8.

In a possible embodiment, the pluggable module 1 provides a single fibre working (SFW) on both interface ports to provide bidirectional east/west communication with an optical network. The add/drop multiplexing (ADM) functionality provided by the pluggable module 1 according to a possible embodiment of the present invention can be either proprietary or standard conform. ADM always needs east and west interfaces. Conventional pluggable modules offer only a bidirectional interface. With the pluggable module 1 according to the present invention, single fibre working (SFW) is used inside the pluggable module 1 on the existing optical ports of the pluggable module 1.

In a preferred embodiment with the ADM as employed by the pluggable module 1 according to the present invention it is possible to configure the ADM-scheme. The configuration can be performed either via the host devices 2 or independently from the host devices 2. An embedded communication channel ECC allows a host to host communication through the pluggable module 1. The host management interface allows to set up ADM-scheme parameters.

If the configuration is performed independently from the host devices 2, the protocol of the embedded communication channel ECC allows to detect how many pluggable modules (M) share a common bandwidth (B). For fair bandwidth distribution, each pluggable module 1 effectively determines a fractional bandwidth B:M. The embedded communication channel ECC then automatically configures a set of M-pluggable modules 1 of a common network to a bandwidth B: M each.

In a possible embodiment, the ADM employed by the pluggable module 1 according to the present invention performs regeneration. When no bandwidth is terminated inside a node, only a passthrough is regenerated for transmission purposes. A further feature of the ADM as employed by the pluggable module 1 according to a possible embodiment of the present invention, is protection, i.e. the ability to switch between a bandwidth termination from east and west side in case of a major event. The ADM-functionality of the pluggable module 1 according to the present invention allows to connect host devices 2 in a multiple node network to share a common optical fibre infrastructure.

The pluggable module 1 can comprise a MSA-compatible optical transceiver with integrated asymmetric Time Division Multiplexing TDM (TDMA). The host interface 8 can be formed by a standard IEEE 802.3 interface with reduced net bandwidth (GB Ethernet or fast Ethernet or Ethernet). The FPGA 32 can be provided within the data path. The transceiver network can be either GPON/EPON based or proprietary. The bandwidth/TDMA time slot configuration can be performed via an optional host. TDMA-schemes are well-known, the most important TDMA-schemes are EPON (Ethernet PON) and GPON (Gigabit PON). PON stands for Passive Optical Network. A passive optical network is a point-to-multipoint, fibre-to-the-premises network architecture used to enable a single optical fibre to serve multiple premises. A passive optical network consists of an optical line termination (OLT) at the service provider central office and a number of optical network units (ONU) at the near end user. A PON configuration reduces the amount of fibre and central office equipment required compared to point-to-point architectures. In order to keep MSA-compliance also on the host interface side 8 of the pluggable module 1 and to avoid the need for host adaptions when supporting the pluggable module 1 according to the present invention, it is preferred to use a standard protocol. Due to the nature of a TDM-scheme, upstream bandwidth compared to ONU is lower than the total bandwidth in the OLT-node. The TDMA basically maps a continuous data stream into a sequence of transmission time intervals.

A feature of the ADM-scheme as employed by the pluggable module 1 according to a possible embodiment of the present invention is the capability to configure the ADM-scheme.

In an embodiment of the pluggable module 1, the configuration of the ADM-scheme is performed via host devices 2. An embedded communication channel ECC enables a host-to-host communication through the pluggable module 1. A host management interface allows to set up TDMA-scheme parameters.

The ADM-functionality of the pluggable module 1 according to the present invention allows to connect host devices 2 in a multiple node-star-network according to a so-called PON-structure that shares a common optical fibre infrastructure. The pluggable module 1 according to the present invention, with the TDMA-function allows to connect a plurality of devices over a PON-infrastructure for additional active data transport devices. The host device 2 can comprise a standard transceiver port. The host device 2 receives an Ethernet data stream with a data throughput which is a fraction of the complete Ethernet bandwidth. In a possible embodiment, the configuration of the bandwidth is performed automatically within the TDMA. In an alternative embodiment, the configuration is performed by transferring configuration parameters.

The pluggable module 1 according to the present invention performs in a possible embodiment an optical amplification or optical attenuation, optical test functions and an optical dispersion compensation. With this functionality it is possible to connect host devices 2 in an optical network comprising sophisticated optical functions like wavelength division multiplexing (WDM) over longer distances between termination nodes that require a power level and dispersion management. The pluggable module 1 according to the present invention performs in an embodiment a monitoring and a manipulation of optical signals.

The invention claimed is:

1. A network comprising:
   at least one host device having an interface card connected to a backplane of said host device, said interface card comprising:
      at least one cage for receiving a pluggable module which is configured to perform a protocol mapping between an application protocol and a transport protocol,
   wherein said pluggable module is a MSA compatible pluggable module which comprises an integrated protocol mapping unit with a power consumption of less than 500 mW, and said integrated protocol mapping unit is formed by a field programmable gate array (FPGA),
   wherein for performing said protocol mapping from the application protocol to said transport protocol said pluggable module is configured to:
      separate management data and user data of said application protocol,
      perform a Generic Framing Procedure (GFP) based mapping of said user data into containers of said transport protocol,
      perform a concatenation of said containers to transport protocol frames each consisting of a header and payload, and to
      perform a direct mapping of said management data of said application protocol into the headers of said transport protocol frames, and
   wherein said pluggable module provides at least one embedded communication channel which is configured to exchange performance monitoring data and configuration data between said pluggable module and a far-end device.

2. The network according to claims 1, wherein said protocol mapping from the transport protocol to said application protocol is performed according to the following steps:
   performing a direct mapping of transport protocol management data provided within headers of transport protocol frames to management data of said application protocol,
   fragmentation of transport protocol frames into containers of said transport protocol,
   performing the GFP (Generic Framing Procedure) based mapping of the containers into user data of said application protocol, and
   combining said directly mapped management data with said GFP mapped user data.

3. The network according to claims 1, wherein said application protocol is formed by an Ethernet protocol or a fibre channel protocol.

4. The network according to claims 1, wherein said transport protocol is formed a SDH protocol or a SONET protocol.

5. The network according to claims 1, wherein said concatenation comprises a virtual concatenation or a contiguous concatenation.

6. The network according to claims 1, wherein during said protocol mapping protocol monitoring parameters are automatically extracted and supplied to said host device.

7. The network according to claim 6, wherein said protocol monitoring parameters indicate variants of the employed application and transport protocols.

8. The network according to claim 1, wherein said integrated protocol mapping unit further comprises an ASIC.

9. A pluggable module configured to be plugged into at least one cage of an interface card, and configured to perform a protocol mapping between a transport protocol and an application protocol, said pluggable module comprising:
   a MSA compatible pluggable module which comprises an integrated protocol mapping unit with a power consumption of less than 500 mW and said integrated protocol mapping unit is formed by a field programmable gate array (FPGA),
   at least one embedded communication channel configured to exchange performance monitoring data and configuration data between said pluggable module and a far-end device,
   wherein for performing said protocol mapping from the application protocol to said transport protocol said pluggable module is configured to:
      separate management data and user data of said application protocol,
      perform a Generic Framing Procedure (GFP) based mapping of said user data into containers of said transport protocol, perform a concatenation of said containers to transport protocol frames each consisting of a header and payload, and to perform a direct mapping of said management data of said application protocol into the headers of said transport protocol frames.

10. A host device comprising at least one interface card connected to a backplane of said host device,
wherein said interface card comprises at least one cage for receiving a pluggable module according to claim 9.

11. A data transport system for transporting optical data via at least one optical fibre, wherein at one or both ends of said optical fibre a pluggable module according to claim 9 is attached.

12. A method for transporting data between host devices of a network via at least one optical fibre, comprising:
connecting a pluggable module attached to said optical fibre to a corresponding cage of one of said host devices;
performing an energy efficient protocol mapping between an application protocol and a transport protocol,
wherein said pluggable module provides at least one embedded communication channel which exchanges performance monitoring data and configuration data between said pluggable module and a far-end device,
wherein said protocol mapping from the application protocol to said transport protocol is performed by:
separating management data and user data of said application protocol,
performing a Generic Framing Procedure (GFP) based mapping of said user data into containers of said transport protocol,
performing a concatenation of said containers to transport protocol frames each consisting of a header and payload, and
performing a direct mapping of said management data of said application protocol into the headers of said transport protocol frames, and
wherein said pluggable module is a MSA compatible pluggable module which comprises an integrated protocol mapping unit with a power consumption of less than 500 mW, and said integrated protocol mapping unit is formed by a field programmable gate array (FPGA).

* * * * *